(12) United States Patent  
Yamamoto

(10) Patent No.: US 7,306,831 B1  
(45) Date of Patent: *Dec. 11, 2007

(54) LIQUID CRYSTAL COMPOSITION AND LIQUID CRYSTAL DISPLAY ELEMENT

(75) Inventor: Hitoshi Yamamoto, Nagano (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 11/107,338

(22) Filed: Apr. 14, 2005

(30) Foreign Application Priority Data

Apr. 14, 2004 (JP) .............................. 2004-119143

(51) Int. Cl.  
C09K 19/30 (2006.01)  
C09K 19/12 (2006.01)  
C09K 19/20 (2006.01)  
C09K 19/52 (2006.01)

(52) U.S. Cl. ............. 428/1.1; 252/299.01; 252/299.63; 252/299.66; 252/299.67

(58) Field of Classification Search ................. 428/1.1; 252/299.01, 299.63, 299.66, 299.67  
See application file for complete search history.

(56) References Cited

U.S. PATENT DOCUMENTS 5,384,065 A    1/1995  Geelhaar et al.

(Continued)

FOREIGN PATENT DOCUMENTS

EP          0 893 423         1/1999

(Continued)

*Primary Examiner*—Shean C. Wu  
(74) *Attorney, Agent, or Firm*—Hogan & Hartson LLP

(57) ABSTRACT

Liquid crystal composition having negative dielectric anisotropy include a first component having at least two compounds represented by at least two formulas selected from formulas (1-1) to (1-6) in the range of 20 to 75% by weight based on the total weight of the liquid crystal composition, and a second component having at least one compound selected from the group of the compounds represented by formulas (2-1) to (2-3) in the range of 25 to 75% by weight based on the total weight of the liquid crystal composition:

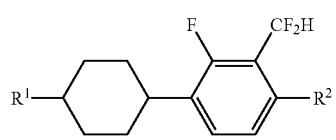

(1-1)

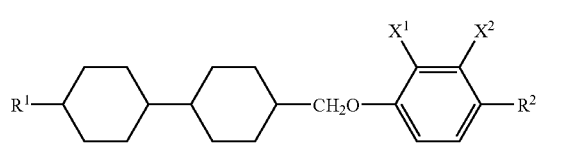

(1-2)

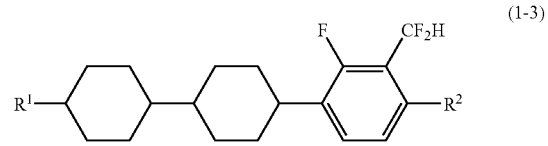

(1-3)

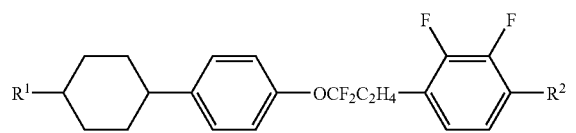

(1-4)

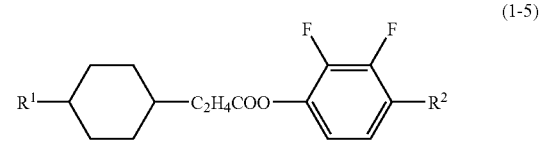

(1-5)

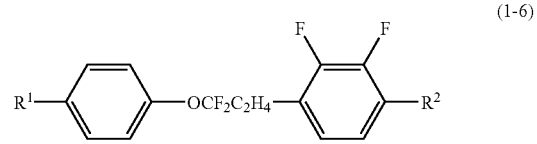

(1-6)

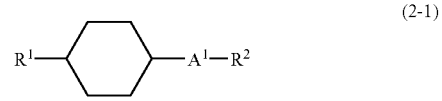

(2-1)

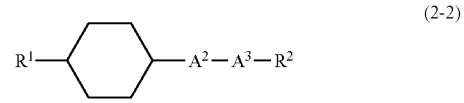

(2-2)

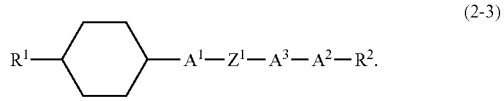

(2-3)

36 Claims, No Drawings

U.S. PATENT DOCUMENTS 6,248,410 B1  6/2001  Ichinose et al.
6,544,604 B2  4/2003  Matsui et al.
2005/0224758 A1 * 10/2005  Yamamoto et al. .... 252/299.63

FOREIGN PATENT DOCUMENTS

| | | |
|---|---|---|
| JP | 09-278698 | 10/1997 |
| JP | 10-251644 | 9/1998 |
| JP | 2003-002858 | 1/2003 |
| JP | 2004-035698 | 2/2004 |

* cited by examiner

LIQUID CRYSTAL COMPOSITION AND LIQUID CRYSTAL DISPLAY ELEMENT

TECHNICAL FIELD

The present invention relates to a liquid crystal composition which is chiefly suitable for an AM (active matrix) element, and an AM element comprising the composition.

BACKGROUND ART

In a liquid crystal display element, the classification based on the operation mode of the liquid crystals includes PC (phase change), TN (twisted nematic), STN (super twisted nematic), OCB (optically compensated bend), IPS (in-plane switching), and VA (vertical alignment), etc. The classification based on the drive system of an element includes PM (passive matrix) and AM (active matrix). PM is classified into static and multiplex, etc., and AM is classified into TFT (thin film transistor) and MIM (metal insulator metal), etc. TFT is classified into amorphous silicon, polycrystal silicon, and continuous grain silicon. Polycrystal silicon is classified into the high temperature type and the low temperature type depending on the production process. The classification based on the source of light includes reflection type using natural light, penetration type using backlight and half penetration type using both natural light and backlight.

These elements comprise a liquid crystal composition having appropriate characteristics. It is necessary to improve the general characteristics of the composition in order to obtain the AM element having excellent general characteristics. The relation between the general characteristics of the composition and those of the AM element is summarized in the following Table 1. The general characteristics of the composition will be explained further based on commercially available AM elements. The temperature range of a nematic phase correlates with the temperature range where the element can be used. A preferable upper limit temperature of a nematic phase is 70° C. or more and a preferable lower limit temperature of a nematic phase is −20° C. or less. The viscosity of the composition correlates with the response time of the element. Short response time is preferable for displaying animation on the element. Therefore, a low viscosity of the composition is preferable. A low viscosity at a low temperature is more preferable.

TABLE 1

General characteristics of the composition and the AM element

| No. | General characteristics of the composition | General characteristics of the AM element |
|---|---|---|
| 1 | Temperature range of a nematic phase is wide. | Temperature range where the element can be used is wide. |
| 2 | Viscosity is low. 1) | Response time is short. |
| 3 | Optical anisotropy is appropriate. | Contrast ratio is large. |
| 4 | Positive or negative dielectric anisotropy is large. | Driving voltage is low. Power consumption is low. |
| 5 | Specific resistance is high. | Voltage holding ratio is high. Contrast ratio is high. |

1) Time of filling the composition into the liquid crystal display(cell?) can be shortened.

Optical anisotropy of the composition correlates with the contrast ratio of the element. The element which has the VA mode, the IPS mode and so on uses electrically controlled birefringence. Then, to maximize the contrast ratio in the element having the VA mode, the IPS mode and so on, a product (Δn·d) of the optical anisotropy (Δn) of the composition and the cell gap (d) of the element is designed to have a constant value. An exemplified value is 0.30 to 0.35 μm (VA mode) or 0.20 to 0.30 μm (IPS mode). Cell gap (d) is usually 3 to 6 μm, and consequently optical anisotropy of the composition is mostly in a range of 0.05 to 0.11. A large dielectric anisotropy of the composition contributes to a low driving voltage of the element. Therefore, a large dielectric anisotropy is preferable. A high specific resistance of the composition contributes to a high voltage holding ratio and a high contrast ratio in the element. Therefore, the composition which has a high specific resistance at the primary stage is preferable. The composition which still has a high specific resistance after prolonged use is preferable.

The composition having positive dielectric anisotropy is used in the AM element which has the TN mode and so on. On the other hand, the composition having negative dielectric anisotropy is used in the AM element which has the VA mode and so on. The composition having either positive or negative dielectric anisotropy is used in the AM element which has the IPS mode and so on. The composition having negative dielectric anisotropy comprises a liquid crystal compound which has negative dielectric anisotropy. This compound has a polarity radical like fluorine on the short axis of the molecule. This compound has 2,3-difluoro-1,4-phenylene, for instance. Examples of the composition having negative dielectric anisotropy are described in the following documents.

[patent documents 1] JP9-278698A (1997) (EP0893423A)

[patent documents 2] JP2003-2858A (U.S. Pat. No. 6,544, 604B2)

[patent documents 3] JP2004-35698A

[patent documents 4] JP10-251644A (1998) (U.S. Pat. No. 6,248,410B1)

[patent documents 5] EP0474062A (U.S. Pat. No. 5,384, 065B1)

DISCLOSURE OF THE INVENTION

Problems to be Solved by the Invention

An object of the present invention is to provide a liquid crystal composition which fulfills two or more of the general characteristics of the composition, i.e., a wide temperature range of nematic phase, a low viscosity, appropriate optical anisotropy, large negative dielectric anisotropy, high specific resistance and so on. Another object is to provide a liquid crystal composition which has two or more of these characteristics appropriately balanced. Another object is to provide a liquid crystal display element which comprises the composition and has a high-voltage holding ratio. Still another object is to provie an AM element which comprises the composition having the characteristics such as a low viscosity, optical anisotropy of 0.05 to 0.11, dielectric anisotropy of −6.5 to −2.0 and so on and which is suitable for the VA mode and the IPS mode and so on.

MEANS FOR SOLVING THE PROBLEM

This invention is described in the following items.

1. A liquid crystal composition having negative dielectric anisotropy comprising:

as a first component, at least two compounds represented by at least two formulas selected from formulas (1-1) to (1-6) in the range of 20 to 75% by weight based on the total weight of the liquid crystal composition, and as a second component, at least one compound selected from the group of the compounds represented by formulas (2-1) to (2-3) in the range of 25 to 75% by weight based on the total weight of the liquid crystal composition;

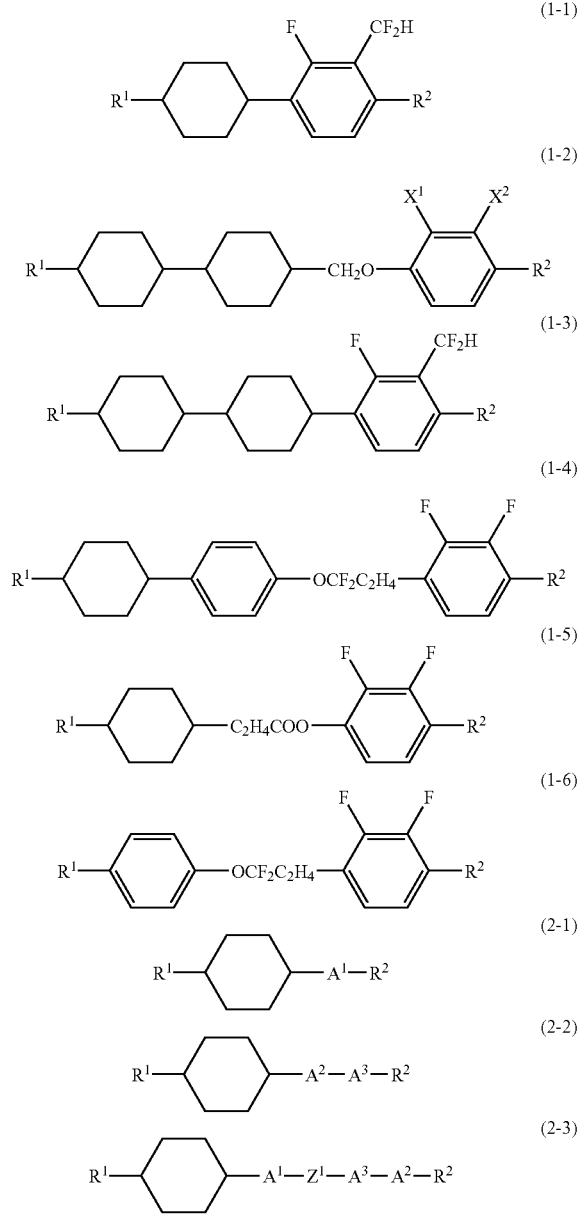

wherein $R^1$ is alkyl or alkenyl; $R^2$ is alkyl, alkenyl or alkoxy; $Z^1$ is a single bond or —COO—; $A^1$ is 1,4-cyclohexylene, 1,4-phenylene, or 1,4-phenylene in which any hydrogen may be replaced by fluorine; $A^2$ is 1,4-cyclohexylene or 1,4-phenylene; $A^3$ is 1,4-phenylene, or 1,4-phenylene in which any hydrogen may be replaced by fluorine; one of $X^1$ and $X^2$ is fluorine and the other is —$CF_2H$.

2. A liquid crystal composition of item 1, wherein $X^1$ is —$CF_2H$ and $X^2$ is fluorine.

3. A liquid crystal composition of item 1 or 2, wherein one of at least two formulas selected from formulas (1-1) to (1-6) as the first component is formula (1-2), (1-4), (1-5) or (1-6).

4. A liquid crystal composition of any of items 1 to 3, wherein the first component is at least two compounds represented by at least two formulas selected from formulas (1-2), (1-4), (1-5) and (1-6).

5. A liquid crystal compound of item 1 or 2, wherein the first component is at least one compound represented by formula (1-4) and at least one compound represented by formula (1-6).

6. A liquid crystal compound of item 1 or 2, wherein the first component is at least one compound represented by formula (1-2) and at least one compound represented by formula (1-4).

7. A liquid crystal compound of item 1 or 2, wherein the first component is at least one compound represented by formula (1-2), at least one compound represented by formula (1-4) and at least one compound represented by formula (1-5).

8. A liquid crystal compound of item 1 or 2, wherein the first component is at least one compound represented by formula (1-2), at least one compound represented by formula (1-4) and at least one compound represented by formula (1-6).

9. A liquid crystal compound of item 1 or 2, wherein the first component is at least one compound represented by formula (1-2) and at least one compound represented by formula (1-5).

10. A liquid crystal compound of item 1 or 2, wherein the first component is at least one compound represented by formula (1-2) and at least one compound represented by formula (1-6).

11. A liquid crystal compound of item 1 or 2, wherein the first component is at least one compound represented by formula (1-3) and at least one compound represented by formula (1-5).

12. A liquid crystal compound of item 1 or 2, wherein the first component is at least one compound represented by formula (1-3) and at least one compound represented by formula (1-6).

13. A liquid crystal compound of item 1 or 2, wherein the first component is at least one compound represented by formula (1-4) and at least one compound represented by formula (1-5).

14. A liquid crystal compound of item 1 or 2, wherein the first component is at least one compound represented by formula (1-3) and at least one compound represented by formula (1-4).

15. A liquid crystal compound of item 1 or 2, wherein the first component is at least one compound represented by formula (1-3), at least one compound represented by formula (1-4) and at least one compound represented by formula (1-5).

16. A liquid crystal compound of item 1 or 2, wherein the first component is at least one compound represented by formula (1-3), at least one compound represented by formula (1-4) and at least one compound represented by formula (1-6).

17. A liquid crystal composition of any of items 1 to 16, wherein the second component is at least one compound selected from the group of the compounds represented by formulas (2-1-1), (2-1-2), (2-1-3), (2-1-4), (2-2-1), (2-2-2), (2-2-3), (2-2-4), (2-2-5), (2-2-6), (2-3-1), (2-3-2), (2-3-3) and (2-3-4);

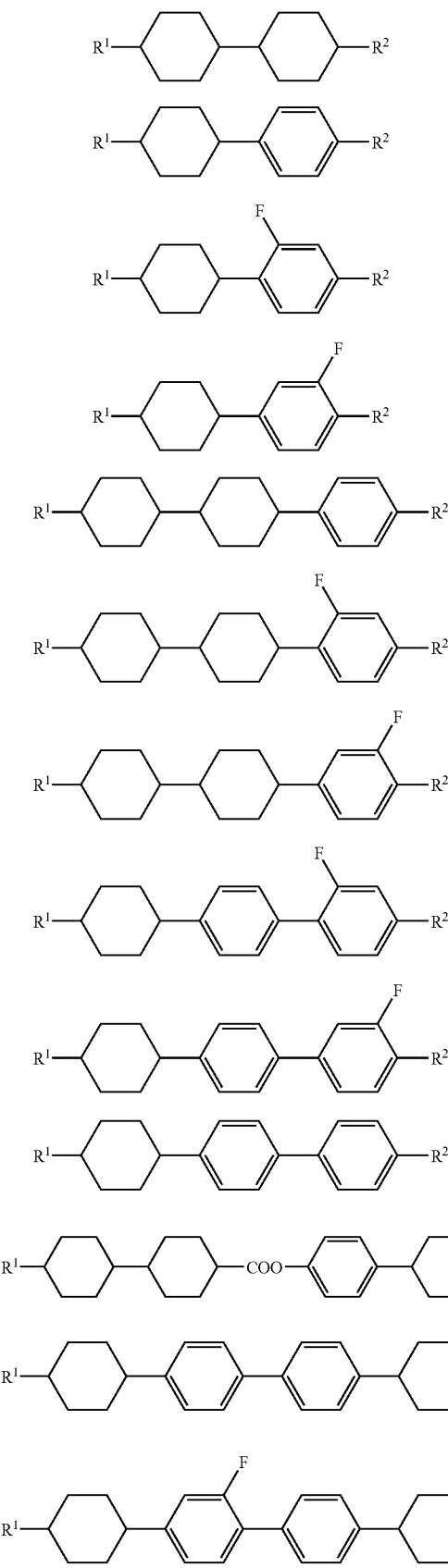

wherein $R^1$ is alkyl or alkenyl; and $R^2$ is alkyl, alkenyl or alkoxy.

18. A liquid crystal composition of item 17, wherein the second component is at least one compound selected from the group of the compounds represented by formula (2-1-1), (2-1-2), (2-2-1), (2-2-4), (2-3-1) and (2-3-4) which is shown in claim 16.

19. A liquid crystal composition of any of items 1 to 18, wherein the dielectric anisotropy ranges from −6.5 to −2.0.

20. A liquid crystal display element which comprises the liquid crystal composition of any of items 1 to 19.

21. A liquid crystal display element of item 20, wherein the element has the VA mode or the IPS mode and is driven by active matrix.

22. A Method of using the liquid crystal composition of any of items 1 to 19 for a liquid crystal display element which has the VA mode or the IPS mode and is driven by active matrix.

EFFECT OF THE INVENTION

The composition of the present invention fulfills two or more of the general characteristics of the liquid crystal composition, such as a wide temperature range of a nematic phase, a low viscosity, appropriate optical anisotropy, negatively large dielectric anisotropy, high specific resistance and so on. The composition has two or more of these characteristics appropriately balanced. The element of the present invention comprises this composition and has a high voltage holding ratio. The element comprises the composition having the characteristics of a low viscosity, optical anisotropy of 0.05 to 0.11, dielectric anisotropy of −6.5 to −2.0, and so on and thus it is suitable for the VA mode and the IPS mode and so on.

BEST MODE FOR CARRYING OUT THE INVENTION

The technical terms used herein are as follows. The liquid crystal composition of this invention or the liquid crystal display element of this invention may be abbreviated to "the composition" or "the element", respectively. The liquid crystal display element is a generic name for the liquid crystal display panel and the liquid crystal display module. The element driven by active matrix may be abbreviated to "the AM element". The element for the TN mode may be abbreviated to "the TN element". The elements for other modes may be similarly abbreviated. The liquid crystal composition contains a liquid crystal compound. This liquid crystal compound is a generic name for a compound having a liquid crystal phase such as a nematic phase, a smectic phase and so on and a compound having no liquid crystal phase but useful as a component of the composition. At least one compound selected from the group of the compounds represented by formula (1) may be abbreviated to "Compound (1)". The compounds represented by other formulas may be similarly abbreviated.

The upper limit temperature of a nematic phase may be abbreviated to "Upper limit temperature". The lower limit temperature of a nematic phase may be abbreviated to "Lower limit temperature". The wording "specific resistance is high" means that the composition has a high specific resistance at the initial stage and even after long-time use. The wording "voltage holding ratio is high" means that the element has a high voltage holding ratio at the initial stage and even after long-time use. The characteristics such as optical anisotropy and so on are explained using the values measured according to the respective methods in the Examples. A ratio (percentage) of the components in the composition is in terms of percent by weight (% by weight) based on the total weight of the composition.

The compositions of the present invention will be explained in the following order: First, composition of the components in the compositions; second, major characteristics of the component compounds and their main effects on the composition; third, preferable ratios of the compounds in the composition and reasons therefore; fourth, preferable embodiments of the component compounds; fifth, specific examples of the component compounds; and sixth, synthesis methods of the component compounds.

First, composition of the components in the composition will be explained. There are 399 types of combination of compounds (1-1) to (1-6) and compounds (2-1) to (2-3). These types 1 to 399 are shown in Tables 2 to 11. In these Tables each column marked with a circle denotes that the corresponding compound is a component compound. A blank column denotes that no corresponding compound is used as a component. In type 1, for example, compounds (1-1), (1-2), (2-1) are components of the composition.

TABLE 2

Example of combination of compounds (1)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 1 | ○ | ○ | | | | | ○ | | |
| 2 | ○ | ○ | | | | | | ○ | |
| 3 | ○ | ○ | | | | | | | ○ |
| 4 | ○ | ○ | | | | | ○ | ○ | |
| 5 | ○ | ○ | | | | | ○ | | ○ |
| 6 | ○ | ○ | | | | | | ○ | ○ |
| 7 | ○ | ○ | | | | | ○ | ○ | ○ |
| 8 | ○ | | ○ | | | | ○ | | |
| 9 | ○ | | ○ | | | | | ○ | |
| 10 | ○ | | ○ | | | | | | ○ |
| 11 | ○ | | ○ | | | | ○ | ○ | |
| 12 | ○ | | ○ | | | | ○ | | ○ |
| 13 | ○ | | ○ | | | | | ○ | ○ |
| 14 | ○ | | ○ | | | | ○ | ○ | ○ |
| 15 | ○ | | | ○ | | | ○ | | |
| 16 | ○ | | | ○ | | | | ○ | |
| 17 | ○ | | | ○ | | | | | ○ |
| 18 | ○ | | | ○ | | | ○ | ○ | |
| 19 | ○ | | | ○ | | | ○ | | ○ |
| 20 | ○ | | | ○ | | | | ○ | ○ |
| 21 | ○ | | | ○ | | | ○ | ○ | ○ |
| 22 | ○ | | | | ○ | | ○ | | |
| 23 | ○ | | | | ○ | | | ○ | |
| 24 | ○ | | | | ○ | | | | ○ |
| 25 | ○ | | | | ○ | | ○ | ○ | |
| 26 | ○ | | | | ○ | | ○ | | ○ |
| 27 | ○ | | | | ○ | | | ○ | ○ |
| 28 | ○ | | | | ○ | | ○ | ○ | ○ |
| 29 | ○ | | | | | ○ | ○ | | |
| 30 | ○ | | | | | ○ | | ○ | |
| 31 | ○ | | | | | ○ | | | ○ |
| 32 | ○ | | | | | ○ | ○ | ○ | |
| 33 | ○ | | | | | ○ | ○ | | ○ |
| 34 | ○ | | | | | ○ | | ○ | ○ |
| 35 | ○ | | | | | ○ | ○ | ○ | ○ |

TABLE 3

Example of combination of compounds (2)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 36 | | ○ | ○ | | | | ○ | | |
| 37 | | ○ | ○ | | | | | ○ | |
| 38 | | ○ | ○ | | | | | | ○ |
| 39 | | ○ | ○ | | | | ○ | ○ | |
| 40 | | ○ | ○ | | | | ○ | | ○ |
| 41 | | ○ | ○ | | | | | ○ | ○ |
| 42 | | ○ | ○ | | | | ○ | ○ | ○ |
| 43 | | ○ | | ○ | | | ○ | | |

TABLE 3-continued

Example of combination of compounds (2)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 44 |  | ○ |  | ○ |  |  |  | ○ |  |
| 45 |  | ○ |  | ○ |  |  |  |  | ○ |
| 46 |  | ○ |  | ○ |  |  | ○ | ○ |  |
| 47 |  | ○ |  | ○ |  |  | ○ |  | ○ |
| 48 |  | ○ |  | ○ |  |  |  | ○ | ○ |
| 49 |  | ○ |  | ○ |  |  | ○ | ○ | ○ |
| 50 |  | ○ |  |  | ○ |  | ○ |  |  |
| 51 |  | ○ |  |  | ○ |  |  | ○ |  |
| 52 |  | ○ |  |  | ○ |  |  |  | ○ |
| 53 |  | ○ |  |  | ○ |  | ○ | ○ |  |
| 54 |  | ○ |  |  | ○ |  | ○ |  | ○ |
| 55 |  | ○ |  |  | ○ |  |  | ○ | ○ |
| 56 |  | ○ |  |  | ○ |  | ○ | ○ | ○ |
| 57 |  | ○ |  |  |  | ○ | ○ |  |  |
| 58 |  | ○ |  |  |  | ○ |  | ○ |  |
| 59 |  | ○ |  |  |  | ○ |  |  | ○ |
| 60 |  | ○ |  |  |  | ○ | ○ | ○ |  |
| 61 |  | ○ |  |  |  | ○ | ○ |  | ○ |
| 62 |  | ○ |  |  |  | ○ |  | ○ | ○ |
| 63 |  | ○ |  |  |  | ○ | ○ | ○ | ○ |
| 64 |  |  | ○ | ○ |  |  | ○ |  |  |
| 65 |  |  | ○ | ○ |  |  |  | ○ |  |
| 66 |  |  | ○ | ○ |  |  |  |  | ○ |
| 67 |  |  | ○ | ○ |  |  | ○ | ○ |  |
| 68 |  |  | ○ | ○ |  |  | ○ |  | ○ |
| 69 |  |  | ○ | ○ |  |  |  | ○ | ○ |
| 70 |  |  | ○ | ○ |  |  | ○ | ○ | ○ |
| 71 |  |  | ○ |  | ○ |  | ○ |  |  |
| 72 |  |  | ○ |  | ○ |  |  | ○ |  |
| 73 |  |  | ○ |  | ○ |  |  |  | ○ |
| 74 |  |  | ○ |  | ○ |  | ○ | ○ |  |
| 75 |  |  | ○ |  | ○ |  | ○ |  | ○ |
| 76 |  |  | ○ |  | ○ |  |  | ○ | ○ |
| 77 |  |  | ○ |  | ○ |  | ○ | ○ | ○ |

TABLE 4

Example of combination of compounds (3)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 78 |  |  | ○ |  |  | ○ | ○ |  |  |
| 79 |  |  | ○ |  |  | ○ |  | ○ |  |
| 80 |  |  | ○ |  |  | ○ |  | ○ |  |
| 81 |  |  | ○ |  |  | ○ | ○ | ○ |  |
| 82 |  |  | ○ |  |  | ○ | ○ |  | ○ |
| 83 |  |  | ○ |  |  | ○ |  | ○ | ○ |
| 84 |  |  | ○ |  |  | ○ | ○ | ○ | ○ |
| 85 |  |  |  | ○ | ○ |  | ○ |  |  |
| 86 |  |  |  | ○ | ○ |  |  | ○ |  |
| 87 |  |  |  | ○ | ○ |  |  |  | ○ |
| 88 |  |  |  | ○ | ○ |  | ○ | ○ |  |
| 89 |  |  |  | ○ | ○ |  | ○ |  | ○ |
| 90 |  |  |  | ○ | ○ |  |  | ○ | ○ |
| 91 |  |  |  | ○ | ○ |  | ○ | ○ | ○ |
| 92 |  |  |  | ○ |  | ○ | ○ |  |  |
| 93 |  |  |  | ○ |  | ○ |  | ○ |  |
| 94 |  |  |  | ○ |  | ○ |  |  | ○ |
| 95 |  |  |  | ○ |  | ○ | ○ | ○ |  |
| 96 |  |  |  | ○ |  | ○ | ○ |  | ○ |
| 97 |  |  |  | ○ |  | ○ |  | ○ | ○ |
| 98 |  |  |  | ○ |  | ○ | ○ | ○ | ○ |
| 99 |  |  |  |  | ○ | ○ | ○ |  |  |
| 100 |  |  |  |  | ○ | ○ |  | ○ |  |
| 101 |  |  |  |  | ○ | ○ |  |  | ○ |
| 102 |  |  |  |  | ○ | ○ | ○ | ○ |  |
| 103 |  |  |  |  | ○ | ○ | ○ |  | ○ |
| 104 |  |  |  |  | ○ | ○ |  | ○ | ○ |
| 105 |  |  |  |  | ○ | ○ | ○ | ○ | ○ |
| 106 | ○ | ○ | ○ |  |  |  | ○ |  |  |

TABLE 4-continued

Example of combination of compounds (3)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 107 | ○ | ○ | ○ | | | | | ○ | |
| 108 | ○ | ○ | ○ | | | | | | ○ |
| 109 | ○ | ○ | ○ | | | | ○ | ○ | |
| 110 | ○ | ○ | ○ | | | | ○ | | ○ |
| 111 | ○ | ○ | ○ | | | | | ○ | ○ |
| 112 | ○ | ○ | ○ | | | | ○ | ○ | ○ |
| 113 | ○ | ○ | | ○ | | | ○ | | |
| 114 | ○ | ○ | | ○ | | | | ○ | |
| 115 | ○ | ○ | | ○ | | | | | ○ |
| 116 | ○ | ○ | | ○ | | | ○ | ○ | |
| 117 | ○ | ○ | | ○ | | | ○ | | ○ |
| 118 | ○ | ○ | | ○ | | | | ○ | ○ |
| 119 | ○ | ○ | | ○ | | | ○ | ○ | ○ |

TABLE 5

Example of combination of compounds (4)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 120 | ○ | ○ | | | ○ | | ○ | | |
| 121 | ○ | ○ | | | ○ | | | ○ | |
| 122 | ○ | ○ | | | ○ | | | | ○ |
| 123 | ○ | ○ | | | ○ | | ○ | ○ | |
| 124 | ○ | ○ | | | ○ | | ○ | | ○ |
| 125 | ○ | ○ | | | ○ | | | ○ | ○ |
| 126 | ○ | ○ | | | ○ | | ○ | ○ | ○ |
| 127 | ○ | ○ | | | | ○ | ○ | | |
| 128 | ○ | ○ | | | | ○ | | ○ | |
| 129 | ○ | ○ | | | | ○ | | | ○ |
| 130 | ○ | ○ | | | | ○ | ○ | ○ | |
| 131 | ○ | ○ | | | | ○ | ○ | | ○ |
| 132 | ○ | ○ | | | | ○ | | ○ | ○ |
| 133 | ○ | ○ | | | | ○ | ○ | ○ | ○ |
| 134 | ○ | | ○ | ○ | | | ○ | | |
| 135 | ○ | | ○ | ○ | | | | ○ | |
| 136 | ○ | | ○ | ○ | | | | | ○ |
| 137 | ○ | | ○ | ○ | | | ○ | ○ | |
| 138 | ○ | | ○ | ○ | | | ○ | | ○ |
| 139 | ○ | | ○ | ○ | | | | ○ | ○ |
| 140 | ○ | | ○ | ○ | | | ○ | ○ | ○ |
| 141 | ○ | | ○ | | ○ | | ○ | | |
| 142 | ○ | | ○ | | ○ | | | ○ | |
| 143 | ○ | | ○ | | ○ | | | | ○ |
| 144 | ○ | | ○ | | ○ | | ○ | ○ | |
| 145 | ○ | | ○ | | ○ | | ○ | | ○ |
| 146 | ○ | | ○ | | ○ | | | ○ | ○ |
| 147 | ○ | | ○ | | ○ | | ○ | ○ | ○ |
| 148 | ○ | | ○ | | | ○ | ○ | | |
| 149 | ○ | | ○ | | | ○ | | ○ | |
| 150 | ○ | | ○ | | | ○ | | | ○ |
| 151 | ○ | | ○ | | | ○ | ○ | ○ | |
| 152 | ○ | | ○ | | | ○ | ○ | | ○ |
| 153 | ○ | | ○ | | | ○ | | ○ | ○ |
| 154 | ○ | | ○ | | | ○ | ○ | ○ | ○ |
| 155 | ○ | | | ○ | ○ | | ○ | | |
| 156 | ○ | | | ○ | ○ | | | ○ | |
| 157 | ○ | | | ○ | ○ | | | | ○ |
| 158 | ○ | | | ○ | ○ | | ○ | ○ | |
| 159 | ○ | | | ○ | ○ | | ○ | | ○ |
| 160 | ○ | | | ○ | ○ | | | ○ | ○ |
| 161 | ○ | | | ○ | ○ | | ○ | ○ | ○ |

TABLE 6

Example of combination of compounds (5)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 162 | ○ |   |   | ○ |   | ○ | ○ |   |   |
| 163 | ○ |   |   | ○ |   | ○ |   | ○ |   |
| 164 | ○ |   |   | ○ |   | ○ |   |   | ○ |
| 165 | ○ |   |   | ○ |   | ○ | ○ | ○ |   |
| 166 | ○ |   |   | ○ |   | ○ | ○ |   | ○ |
| 167 | ○ |   |   | ○ |   | ○ |   | ○ | ○ |
| 168 | ○ |   |   | ○ |   | ○ | ○ | ○ | ○ |
| 169 | ○ |   |   |   | ○ | ○ | ○ |   |   |
| 170 | ○ |   |   |   | ○ | ○ |   | ○ |   |
| 171 | ○ |   |   |   | ○ | ○ |   |   | ○ |
| 172 | ○ |   |   |   | ○ | ○ | ○ | ○ |   |
| 173 | ○ |   |   |   | ○ | ○ | ○ |   | ○ |
| 174 | ○ |   |   |   | ○ | ○ |   | ○ | ○ |
| 175 | ○ |   |   |   | ○ | ○ | ○ | ○ | ○ |
| 176 |   | ○ | ○ | ○ |   |   | ○ |   |   |
| 177 |   | ○ | ○ | ○ |   |   |   | ○ |   |
| 178 |   | ○ | ○ | ○ |   |   |   |   | ○ |
| 179 |   | ○ | ○ | ○ |   |   | ○ | ○ |   |
| 180 |   | ○ | ○ | ○ |   |   | ○ |   | ○ |
| 181 |   | ○ | ○ | ○ |   |   |   | ○ | ○ |
| 182 |   | ○ | ○ | ○ |   |   | ○ | ○ | ○ |
| 183 |   | ○ | ○ |   | ○ |   | ○ |   |   |
| 184 |   | ○ | ○ |   | ○ |   |   | ○ |   |
| 185 |   | ○ | ○ |   | ○ |   |   |   | ○ |
| 186 |   | ○ | ○ |   | ○ |   | ○ | ○ |   |
| 187 |   | ○ | ○ |   | ○ |   | ○ |   | ○ |
| 188 |   | ○ | ○ |   | ○ |   |   | ○ | ○ |
| 189 |   | ○ | ○ |   | ○ |   | ○ | ○ | ○ |
| 190 |   | ○ | ○ |   |   | ○ | ○ |   |   |
| 191 |   | ○ | ○ |   |   | ○ |   | ○ |   |
| 192 |   | ○ | ○ |   |   | ○ |   |   | ○ |
| 193 |   | ○ | ○ |   |   | ○ | ○ | ○ |   |
| 194 |   | ○ | ○ |   |   | ○ | ○ |   | ○ |
| 195 |   | ○ | ○ |   |   | ○ |   | ○ | ○ |
| 196 |   | ○ | ○ |   |   | ○ | ○ | ○ | ○ |
| 197 |   | ○ |   | ○ | ○ |   | ○ |   |   |
| 198 |   | ○ |   | ○ | ○ |   |   | ○ |   |
| 199 |   | ○ |   | ○ | ○ |   |   |   | ○ |
| 200 |   | ○ |   | ○ | ○ |   | ○ | ○ |   |
| 201 |   | ○ |   | ○ | ○ |   | ○ |   | ○ |
| 202 |   | ○ |   | ○ | ○ |   |   | ○ | ○ |
| 203 |   | ○ |   | ○ | ○ |   | ○ | ○ | ○ |

TABLE 7

Example of combination of compounds (6)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 204 |   | ○ |   | ○ |   | ○ | ○ |   |   |
| 205 |   | ○ |   | ○ |   | ○ |   | ○ |   |
| 206 |   | ○ |   | ○ |   | ○ |   |   | ○ |
| 207 |   | ○ |   | ○ |   | ○ | ○ | ○ |   |
| 208 |   | ○ |   | ○ |   | ○ | ○ |   | ○ |
| 209 |   | ○ |   | ○ |   | ○ |   | ○ | ○ |
| 210 |   | ○ |   | ○ |   | ○ | ○ | ○ | ○ |
| 211 |   | ○ |   |   | ○ | ○ | ○ |   |   |
| 212 |   | ○ |   |   | ○ | ○ |   | ○ |   |
| 213 |   | ○ |   |   | ○ | ○ |   |   | ○ |
| 214 |   | ○ |   |   | ○ | ○ | ○ | ○ |   |
| 215 |   | ○ |   |   | ○ | ○ | ○ |   | ○ |
| 216 |   | ○ |   |   | ○ | ○ |   | ○ | ○ |
| 217 |   | ○ |   |   | ○ | ○ | ○ | ○ | ○ |
| 218 |   |   | ○ | ○ | ○ |   | ○ |   |   |
| 219 |   |   | ○ | ○ | ○ |   |   | ○ |   |
| 220 |   |   | ○ | ○ | ○ |   |   |   | ○ |
| 221 |   |   | ○ | ○ | ○ |   | ○ | ○ |   |
| 222 |   |   | ○ | ○ | ○ |   | ○ |   | ○ |
| 223 |   |   | ○ | ○ | ○ |   |   | ○ | ○ |
| 224 |   |   | ○ | ○ | ○ |   | ○ | ○ | ○ |

TABLE 7-continued

Example of combination of compounds (6)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 225 |  |  | ○ | ○ |  | ○ | ○ |  |  |
| 226 |  |  | ○ | ○ |  | ○ |  | ○ |  |
| 227 |  |  | ○ | ○ |  | ○ |  |  | ○ |
| 228 |  |  | ○ | ○ |  | ○ | ○ | ○ |  |
| 229 |  |  | ○ | ○ |  | ○ | ○ |  | ○ |
| 230 |  |  | ○ | ○ |  | ○ |  | ○ | ○ |
| 231 |  |  | ○ | ○ |  | ○ | ○ | ○ | ○ |
| 232 |  |  | ○ |  | ○ | ○ | ○ |  |  |
| 233 |  |  | ○ |  | ○ | ○ |  | ○ |  |
| 234 |  |  | ○ |  | ○ | ○ |  |  | ○ |
| 235 |  |  | ○ |  | ○ | ○ | ○ | ○ |  |
| 236 |  |  | ○ |  | ○ | ○ | ○ |  | ○ |
| 237 |  |  | ○ |  | ○ | ○ |  | ○ | ○ |
| 238 |  |  | ○ |  | ○ | ○ | ○ | ○ | ○ |
| 239 |  |  |  | ○ | ○ | ○ | ○ |  |  |
| 240 |  |  |  | ○ | ○ | ○ |  | ○ |  |
| 241 |  |  |  | ○ | ○ | ○ |  |  | ○ |
| 242 |  |  |  | ○ | ○ | ○ | ○ | ○ |  |
| 243 |  |  |  | ○ | ○ | ○ | ○ |  | ○ |
| 244 |  |  |  | ○ | ○ | ○ |  | ○ | ○ |
| 245 |  |  |  | ○ | ○ | ○ | ○ | ○ | ○ |

TABLE 8

Example of combination of compounds (7)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 246 | ○ | ○ | ○ | ○ |  |  | ○ |  |  |
| 247 | ○ | ○ | ○ | ○ |  |  |  | ○ |  |
| 248 | ○ | ○ | ○ | ○ |  |  |  |  | ○ |
| 249 | ○ | ○ | ○ | ○ |  |  | ○ | ○ |  |
| 250 | ○ | ○ | ○ | ○ |  |  | ○ |  | ○ |
| 251 | ○ | ○ | ○ | ○ |  |  |  | ○ | ○ |
| 252 | ○ | ○ | ○ | ○ |  |  | ○ | ○ | ○ |
| 253 | ○ | ○ | ○ |  | ○ |  | ○ |  |  |
| 254 | ○ | ○ | ○ |  | ○ |  |  | ○ |  |
| 255 | ○ | ○ | ○ |  | ○ |  |  |  | ○ |
| 256 | ○ | ○ | ○ |  | ○ |  | ○ | ○ |  |
| 257 | ○ | ○ | ○ |  | ○ |  | ○ |  | ○ |
| 258 | ○ | ○ | ○ |  | ○ |  |  | ○ | ○ |
| 259 | ○ | ○ | ○ |  | ○ |  | ○ | ○ | ○ |
| 260 | ○ | ○ | ○ |  |  | ○ | ○ |  |  |
| 261 | ○ | ○ | ○ |  |  | ○ |  | ○ |  |
| 262 | ○ | ○ | ○ |  |  | ○ |  |  | ○ |
| 263 | ○ | ○ | ○ |  |  | ○ | ○ | ○ |  |
| 264 | ○ | ○ | ○ |  |  | ○ | ○ |  | ○ |
| 265 | ○ | ○ | ○ |  |  | ○ |  | ○ | ○ |
| 266 | ○ | ○ | ○ |  |  | ○ | ○ | ○ | ○ |
| 267 | ○ | ○ |  | ○ | ○ |  | ○ |  |  |
| 268 | ○ | ○ |  | ○ | ○ |  |  | ○ |  |
| 269 | ○ | ○ |  | ○ | ○ |  |  |  | ○ |
| 270 | ○ | ○ |  | ○ | ○ |  | ○ | ○ |  |
| 271 | ○ | ○ |  | ○ | ○ |  | ○ |  | ○ |
| 272 | ○ | ○ |  | ○ | ○ |  |  | ○ | ○ |
| 273 | ○ | ○ |  | ○ | ○ |  | ○ | ○ | ○ |
| 274 | ○ | ○ |  | ○ |  | ○ | ○ |  |  |
| 275 | ○ | ○ |  | ○ |  | ○ |  | ○ |  |
| 276 | ○ | ○ |  | ○ |  | ○ |  |  | ○ |
| 277 | ○ | ○ |  | ○ |  | ○ | ○ | ○ |  |
| 278 | ○ | ○ |  | ○ |  | ○ | ○ |  | ○ |
| 279 | ○ | ○ |  | ○ |  | ○ |  | ○ | ○ |
| 280 | ○ | ○ |  | ○ |  | ○ | ○ | ○ | ○ |
| 281 | ○ | ○ |  |  | ○ | ○ | ○ |  |  |
| 282 | ○ | ○ |  |  | ○ | ○ |  | ○ |  |
| 283 | ○ | ○ |  |  | ○ | ○ |  |  | ○ |
| 284 | ○ | ○ |  |  | ○ | ○ | ○ | ○ |  |
| 285 | ○ | ○ |  |  | ○ | ○ | ○ |  | ○ |

TABLE 8-continued

Example of combination of compounds (7)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 286 | ○ | ○ | | | ○ | ○ | | ○ | ○ |
| 287 | ○ | ○ | | | ○ | ○ | ○ | ○ | ○ |

TABLE 9

Example of combination of compounds (8)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 288 | ○ | | ○ | ○ | ○ | | ○ | | |
| 289 | ○ | | ○ | ○ | ○ | | | ○ | |
| 290 | ○ | | ○ | ○ | ○ | | | | ○ |
| 291 | ○ | | ○ | ○ | ○ | | ○ | ○ | |
| 292 | ○ | | ○ | ○ | ○ | | ○ | | ○ |
| 293 | ○ | | ○ | ○ | ○ | | | ○ | ○ |
| 294 | ○ | | ○ | ○ | ○ | | ○ | ○ | ○ |
| 295 | ○ | | ○ | ○ | | | ○ | | |
| 296 | ○ | | ○ | ○ | | ○ | | ○ | |
| 297 | ○ | | ○ | ○ | | ○ | | | ○ |
| 298 | ○ | | ○ | ○ | | ○ | ○ | ○ | |
| 299 | ○ | | ○ | ○ | | ○ | ○ | | ○ |
| 300 | ○ | | ○ | ○ | | ○ | | ○ | ○ |
| 301 | ○ | | ○ | ○ | | ○ | ○ | ○ | ○ |
| 302 | ○ | | ○ | ○ | | ○ | ○ | | |
| 303 | ○ | | ○ | | ○ | ○ | | ○ | |
| 304 | ○ | | ○ | | ○ | ○ | | | ○ |
| 305 | ○ | | ○ | | ○ | ○ | ○ | ○ | |
| 306 | ○ | | ○ | | ○ | ○ | ○ | | ○ |
| 307 | ○ | | ○ | | ○ | ○ | | ○ | ○ |
| 308 | ○ | | ○ | | ○ | ○ | ○ | ○ | ○ |
| 309 | ○ | | ○ | ○ | ○ | | ○ | | |
| 310 | ○ | | ○ | ○ | ○ | | | ○ | |
| 311 | ○ | | ○ | ○ | ○ | | | | ○ |
| 312 | ○ | | ○ | ○ | ○ | | ○ | ○ | |
| 313 | ○ | | ○ | ○ | ○ | | ○ | | ○ |
| 314 | ○ | | ○ | ○ | ○ | | | ○ | ○ |
| 315 | ○ | | ○ | ○ | ○ | | ○ | ○ | ○ |
| 316 | | ○ | ○ | ○ | ○ | | ○ | | |
| 317 | | ○ | ○ | ○ | ○ | | | ○ | |
| 318 | | ○ | ○ | ○ | ○ | | | | ○ |
| 319 | | ○ | ○ | ○ | ○ | | ○ | ○ | |
| 320 | | ○ | ○ | ○ | ○ | | ○ | | ○ |
| 321 | | ○ | ○ | ○ | ○ | | | ○ | ○ |
| 322 | | ○ | ○ | ○ | ○ | | ○ | ○ | ○ |
| 323 | | ○ | ○ | ○ | | ○ | ○ | | |
| 324 | | ○ | ○ | ○ | | ○ | | ○ | |
| 325 | | ○ | ○ | ○ | | ○ | | | ○ |
| 326 | | ○ | ○ | ○ | | ○ | ○ | ○ | |
| 327 | | ○ | ○ | ○ | | ○ | ○ | | ○ |
| 328 | | ○ | ○ | ○ | | ○ | | ○ | ○ |
| 329 | | ○ | ○ | ○ | | ○ | ○ | ○ | ○ |

TABLE 10

Example of combination of compounds (9)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 330 | | ○ | ○ | | ○ | ○ | ○ | | |
| 331 | | ○ | ○ | | ○ | ○ | | ○ | |
| 332 | | ○ | ○ | | ○ | ○ | | | ○ |
| 333 | | ○ | ○ | | ○ | ○ | ○ | ○ | |
| 334 | | ○ | ○ | | ○ | ○ | ○ | | ○ |
| 335 | | ○ | ○ | | ○ | ○ | | ○ | ○ |
| 336 | | ○ | ○ | | ○ | ○ | ○ | ○ | ○ |
| 337 | | ○ | | ○ | ○ | ○ | ○ | | |
| 338 | | ○ | | ○ | ○ | ○ | | ○ | |

TABLE 10-continued

Example of combination of compounds (9)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 339 |   | ○ |   | ○ | ○ | ○ |   |   | ○ |
| 340 |   | ○ |   | ○ | ○ | ○ | ○ | ○ |   |
| 341 |   | ○ |   | ○ | ○ | ○ | ○ |   | ○ |
| 342 |   | ○ |   | ○ | ○ | ○ |   | ○ | ○ |
| 343 |   | ○ |   | ○ | ○ | ○ | ○ | ○ | ○ |
| 344 |   |   |   | ○ | ○ | ○ | ○ |   |   |
| 345 |   |   | ○ | ○ | ○ | ○ |   | ○ |   |
| 346 |   |   | ○ | ○ | ○ | ○ |   |   | ○ |
| 347 |   |   | ○ | ○ | ○ | ○ | ○ | ○ |   |
| 348 |   |   | ○ | ○ | ○ | ○ | ○ |   | ○ |
| 349 |   |   | ○ | ○ | ○ | ○ |   | ○ | ○ |
| 350 |   |   | ○ | ○ | ○ | ○ | ○ | ○ | ○ |
| 351 | ○ | ○ | ○ | ○ | ○ |   | ○ |   |   |
| 352 | ○ | ○ | ○ | ○ | ○ |   |   | ○ |   |
| 353 | ○ | ○ | ○ | ○ | ○ |   |   |   | ○ |
| 354 | ○ | ○ | ○ | ○ | ○ |   | ○ | ○ |   |
| 355 | ○ | ○ | ○ | ○ | ○ |   | ○ |   | ○ |
| 356 | ○ | ○ | ○ | ○ | ○ |   |   | ○ | ○ |
| 357 | ○ | ○ | ○ | ○ | ○ | ○ | ○ | ○ | ○ |
| 358 | ○ |   |   | ○ | ○ | ○ | ○ |   |   |
| 359 | ○ |   |   | ○ | ○ | ○ |   | ○ |   |
| 360 | ○ |   |   | ○ | ○ | ○ |   |   | ○ |
| 361 | ○ |   |   | ○ | ○ | ○ | ○ | ○ |   |
| 362 | ○ |   | ○ | ○ | ○ | ○ |   |   | ○ |
| 363 | ○ |   | ○ | ○ | ○ | ○ |   | ○ | ○ |
| 364 | ○ |   | ○ | ○ | ○ | ○ | ○ | ○ | ○ |
| 365 | ○ | ○ |   | ○ | ○ | ○ |   |   |   |
| 366 | ○ | ○ |   | ○ | ○ | ○ |   | ○ |   |
| 367 | ○ | ○ |   | ○ | ○ | ○ |   |   | ○ |
| 368 | ○ | ○ |   | ○ | ○ | ○ | ○ | ○ |   |
| 369 | ○ | ○ |   | ○ | ○ | ○ | ○ |   | ○ |
| 370 | ○ | ○ |   | ○ | ○ | ○ |   | ○ | ○ |
| 371 | ○ | ○ |   | ○ | ○ | ○ | ○ | ○ | ○ |

TABLE 11

Example of combination of compounds (10)

| Type | Comp. (1-1) | Comp. (1-2) | Comp. (1-3) | Comp. (1-4) | Comp. (1-5) | Comp. (1-6) | Comp. (2-1) | Comp. (2-2) | Comp. (2-3) |
|---|---|---|---|---|---|---|---|---|---|
| 372 | ○ | ○ | ○ |   | ○ | ○ | ○ |   |   |
| 373 | ○ | ○ | ○ |   | ○ | ○ |   | ○ |   |
| 374 | ○ | ○ | ○ |   | ○ | ○ |   |   | ○ |
| 375 | ○ | ○ | ○ |   | ○ | ○ | ○ | ○ |   |
| 376 | ○ | ○ | ○ |   | ○ | ○ | ○ |   | ○ |
| 377 | ○ | ○ | ○ |   | ○ | ○ |   | ○ | ○ |
| 378 | ○ | ○ | ○ |   | ○ | ○ | ○ | ○ | ○ |
| 379 | ○ | ○ | ○ |   |   | ○ | ○ |   |   |
| 380 | ○ | ○ | ○ | ○ |   | ○ |   | ○ |   |
| 381 | ○ | ○ | ○ | ○ |   | ○ |   |   | ○ |
| 382 | ○ | ○ | ○ | ○ |   | ○ | ○ | ○ |   |
| 383 | ○ | ○ | ○ | ○ |   | ○ | ○ |   | ○ |
| 384 | ○ | ○ | ○ | ○ |   | ○ |   | ○ | ○ |
| 385 | ○ | ○ | ○ | ○ |   | ○ | ○ | ○ | ○ |
| 386 |   | ○ | ○ | ○ | ○ | ○ | ○ |   |   |
| 387 |   | ○ | ○ | ○ | ○ | ○ |   | ○ |   |
| 388 |   | ○ | ○ | ○ | ○ | ○ |   |   | ○ |
| 389 |   | ○ | ○ | ○ | ○ | ○ | ○ | ○ |   |
| 390 |   | ○ | ○ | ○ | ○ | ○ | ○ |   | ○ |
| 391 |   | ○ | ○ | ○ | ○ | ○ |   | ○ | ○ |
| 392 |   | ○ | ○ | ○ | ○ | ○ | ○ |   | ○ |
| 393 | ○ | ○ | ○ | ○ | ○ | ○ |   |   |   |
| 394 | ○ | ○ | ○ | ○ | ○ | ○ |   | ○ |   |
| 395 | ○ | ○ | ○ | ○ | ○ | ○ |   |   | ○ |
| 396 | ○ | ○ | ○ | ○ | ○ | ○ | ○ | ○ |   |
| 397 | ○ | ○ | ○ | ○ | ○ | ○ | ○ |   | ○ |
| 398 | ○ | ○ | ○ | ○ | ○ | ○ |   | ○ | ○ |
| 399 | ○ | ○ | ○ | ○ | ○ | ○ | ○ | ○ | ○ |

The first component is at least two compounds represented by at least two formulas selected from the group of formulas (1-1) to (1-6). Examples of at least two formulas include formulas (1-2) and (1-4), formulas (1-2), (1-4) and (1-5), formulas (1-2), (1-4), (1-5), and (1-6), and so on. The compound represented by formula (1-2) may be a single compound or two or more compounds. This rule is applied to the compounds represented by other formulas. Preferable combination of at least two compounds represented by two formulas is compounds (1-4) and (1-6), compounds (1-2) and (1-4), compounds (1-2) and (1-5), compounds (1-2) and (1-6), compounds (1-3) and (1-5), compounds (1-3) and (1-6), compounds (1-4) and (1-5), compounds (1-3) and (1-4), and so on. Preferable combination of at least three compounds represented by three formulas is compounds (1-2), (1-4) and (1-5), compounds (1-2), (1-4) and (1-6), compounds (1-3), (1-4) and (1-5), compounds (1-3), (1-4) and (1-6), and so on. From the viewpoint of low viscosity, more preferable combination is compounds (1-4) and (1-6), compounds (1-2) and (1-4), compounds (1-2), (1-4) and (1-5), compounds (1-2), (1-4) and (1-6), and so on.

The composition of this invention is classified into composition A and composition B. Composition A may further contain other compounds. "Other compounds" include a liquid crystalline compound, additives, and impurities, and so on. This liquid crystalline compound differs from compounds (1-1) to (1-6) and compounds (2-1) to (2-3). It is mixed with the composition for the purpose of adjusting the characteristics of the composition. The additives include an optically active compound, a coloring matter, an ultraviolet rays absorbent, an antioxidant, or the like. An optically active compound is mixed with the composition for the purpose of generating a spiral structure of the liquid crystal to give a twist angle. A coloring matter is mixed with the composition to suit for the element having the GH (guest host) mode. Impurities are compounds and the like which mix during the processes of synthesizing the compound, preparing the composition, or the like.

Composition B consists essentially of the compounds selected from compounds (1-1) to (1-6) and compounds (2-1) to (2-3). The term "essentially" means that composition B does not contain any liquid crystalline compound different from these compounds. The term "essentially" also means that composition B may further contain additives and impurities, and so on. Composition B comprises less components in number than composition A. From the viewpoint of the cost, composition B is preferable than composition A. On the other hand, composition A is preferable than composition B in that the physical properties of composition A can be adjusted further by mixing other liquid crystalline compounds.

Examples of the ultraviolet rays absorbent include benzophenone, benzoate, triazole, and the like. Examples of benzophenone include 2-hydroxy-4-octoxybenzophenone, and the like. Examples of benzoate include 2,4-di-tert-butylphenyl-3,5-di-tert-butyl-4-hydroxybenzoate, and the like. Examples of triazole include 2-(2-hydroxy-5-methylphenyl)benzotriazole, 2-[2-hydroxy-3-(3,4,5,6-tetrahydroxyphthalimido-methyl)-5-methylphenyl]benzotriazole, 2-(3-tert-butyl-2-hydroxy-5-methylphenyl)-5-chrolobenzotriazole, and the like.

Examples of the antioxidant include a phenol, an organosulfur compound, and the like. Examples of the phenol include 3,5-di-tert-butyl-4-hydroxytoluene, 2,2'-methylene bis(6-tert-butyl-4-methylphenol), 4,4'-butylidenebis(6-tert-butyl-3-methylphenol), 2,6-di-tert-butyl-4-(2-octadecyloxycarbonyl)ethylphenol, pentaerythritoltetrakis[3-(3,5-di-tert-butyl-4-hydroxyphenyl)propionate, and the like. Examples of the organosulfur compound include dilauryl-3,3'-thiopropionate, dimyristyl-3,3'-thiopropionate, distearyl-3,3'-thiopropionate, pentaerythritoltetrakis(3-laurylthiopropionate), 2-mercaptobenzimidazole, and the like.

A large amount of the additives such as an ultraviolet rays absorbent or an antioxidant is desirable for their primary purposes per se. However, an excessively large amount of the additives is undesirable for the general characteristics of the composition. When the composition is heated, a large amount of the antioxidant can prevent the decrease in the specific resistance. However, an excessively large amount of the antioxidant may lower the upper limit temperature of the composition. A preferable ratio of an ultraviolet rays absorbent or an antioxidant is, for instance, 10 to 500 ppm based on the total weight of the composition. A more preferable ratio is 30 to 300 ppm. A most preferable ratio is 40 to 200 ppm.

Second, the chief characteristics of the component compounds and their main effects on the composition will be explained. The chief characteristics of the compounds are shown in Table 12, wherein L means large or high, M means middle, and S means small or low. 0 means that dielectric anisotropy is almost 0 (or extremely small). The symbols L, M, and S are given based on relative evaluations of these compounds.

TABLE 12

Characteristics of the compounds

| Compound | (1-1) | (1-2) | (1-3) | (1-4) | (1-5) | (1-6) | (2-1) | (2-2) | (2-3) |
|---|---|---|---|---|---|---|---|---|---|
| Upper limit temperature | S | M-L | M-L | M-L | S | S | S-M | M-L | L |
| Viscosity | L | L | L | M | M | M | S | M | M-L |
| Optical anisotropy | S | M | M | M-L | M | M | S-M | M-L | M-L |
| Dielectric anisotropy | $L^{1)}$ | $L^{1)}$ | $L^{1)}$ | $M^{1)}$ | $M^{1)}$ | $M^{1)}$ | 0 | 0 | 0 |
| Specific resistance | L | L | L | L | L | L | L | L | L |

[1]Dielectric anisotropy of the compound is negative.

The compound whose dielectric anisotropy is −1.5 or less is preferable as the first component. The compound whose dielectric anisotropy is −1.5 to 1.5 is preferable as the second component.

Third, preferable ratios of the components and reasons therefor will be explained. A preferable ratio of the first component is 20% or more for negatively increasing the dielectric anisotropy or reducing the threshold voltage, and is 75% or lese; for reducing the lower limit temperature. A more preferable ratio is 30 to 70%. A preferable ratio of the second component is 25% or more for reducing the viscosity, and is 75% or less for negatively increasing the dielectric anisotropy or reducing the threshold voltage. A more preferable ratio is 35 to 65%.

Forth, preferable forms of the component compounds will be explained. The symbol $R^1$ is used in two or more of the component compounds. In these compounds, the meaning of any two $R^1$ may be the same or different. For example, there is a case where $R^1$ of compound (1-1) is alkyl, and $R^1$ of compound (1-2) is alkenyl. This rule is also applied to the symbols of $R^2$, $A^1$, $A^2$, $A^3$ or $Z^1$.

Preferable $R^1$ is alkyls of 1 to 10 carbon atoms or alkenyls of 2 to 10 carbon atoms. More preferable $R^1$ is alkyls of 1 to 7 carbon atoms or alkenyls of 2 to 7 carbon atoms. Preferable $R^2$ is alkyls of 1 to 10 carbon atoms, alkenyls of 2 to 10 carbon atoms or alkoxys of 1 to 10 carbon atoms. More preferable $R^2$ is alkyls of 1 to 7 carbon atoms, alkenyls of 2 to 7 carbon atoms or alkoxys of 1 to 7 carbon atoms.

A preferable alkyl is methyl, ethyl, propyl, butyl, pentyl, hexyl, heptyl or octyl. A more preferable alkyl is ethyl, propyl, butyl, pentyl or heptyl.

A preferable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. A more preferable alkenyl is a vinyl, 1-propenyl, 3-butenyl, or 3-pentenyl. A preferable configuration of —CH═CH— in these alkenyls depends on the position of the double bond. In the alkenyl such as 1-propenyl, 1-butenyl, 1-pentenyl, 1-hexenyl, 3-pentenyl, or 3-hexenyl, trans-configuration is preferable. In the alkenyl such as 2-butenyl, 2-pentenyl or 2-hexenyl, cis-configuration is preferable.

A preferable alkoxy is methoxy, ethoxy, propoxy, butoxy, pentyloxy, hexyloxy, or heptyloxy. A more preferable alkoxy is methoxy or ethoxy.

In the component compounds, the configuration of 1,4-cyclohexylene is preferably in trans-form than cis-form. In the definition of $A^1$ or $A^3$, "1,4-phenylene in which any hydrogen may be replaced by a fluorine" is 2-fluoro-1,4-phenylene, 2,5-difluoro-1,4-phenylene, 2,6-difluoro-1,4-phenylene, 2,3,5-trifluoro-1,4-phenylene, or 2,3,5,6-tetrafluoro-1,4-phenylene. Preferable $A^1$ or $A^3$ is 1,4-phenylene, 2-fluoro-1,4-phenylene, 2,5-difluoro-1,4-phenylene, or 2,6-difluoro-1,4-phenylene. More preferable $A^1$ or $A^3$ is 1,4-phenylene or 2-fluoro-1,4-phenylene. Because 2-fluoro-1,4-phenylene is identical with 3-fluoro-1,4-phenylene, the latter is not shown here. This rule is applied to the relation between 2,5-difluoro-1,4-phenylene and 3,6-difluoro-1,4-phenylene and so on.

Fifth, concrete examples of the component compounds will be shown. Preferable compound (1-2) is compounds (1-2-1) and (1-2-2). Compound (1-2-1) is more preferable. Preferable compound (2-1) is compounds (2-1-1) to (2-1-4). Preferable compound (2-2) is compounds (2-2-1) to (2-2-6). Preferable compound (2-3) is compounds (2-3-1) to (2-3-4). More preferable compounds (2-1) to (2-3) are compounds (2-1-1), (2-1-2), (2-2-1), (2-2-4), (2-3-1), and, (2-3-4). The symbols $R^1$ and $R^2$ are used in two or more of these compounds. In any two compounds, the meaning of $R^1$ may be the same or different as already mentioned hereinabove.

$R^1$ is alkyl or alkenyl. Preferable $R^1$ is alkyls of 1 to 10 carbon atoms or alkenyl of 2 to 10 carbon atoms. $R^2$ is alkyl, alkenyl or alkoxy. Preferable $R^2$ is alkyls of 1 to 10 carbon atoms, alkenyl of 2 to 10 carbon atoms or alkoxy of 1 to 10 carbon atoms. Preferable alkyl, alkenyl or alkoxy and more preferable alkyl, alkenyl or alkoxy are as already described. A preferable configuration of —CH═CH— in these alkenyls is the same as already described. In these preferable compounds, the configuration of 1,4-cyclohexylene is preferably in trans-form than cis-form.

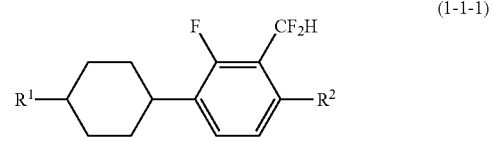
(1-1-1)

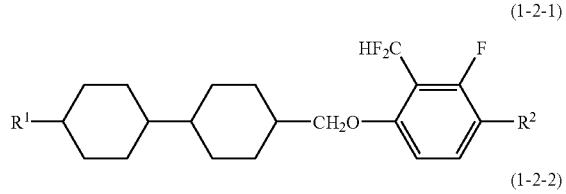
(1-2-1)

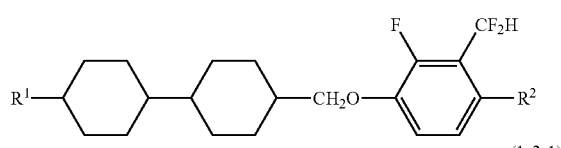
(1-2-2)

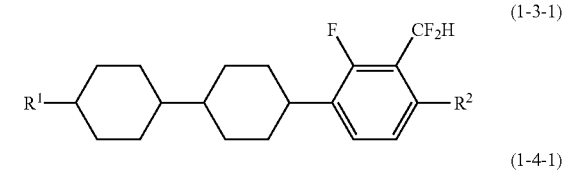
(1-3-1)

(1-4-1)

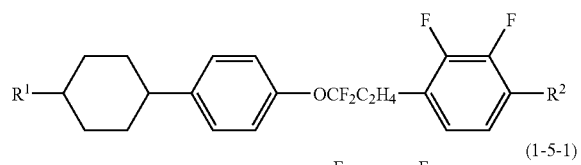
(1-5-1)

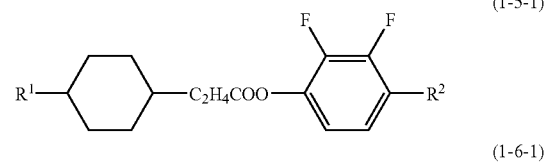
(1-6-1)

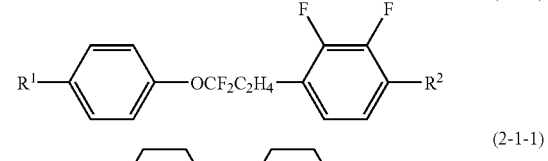
(2-1-1)

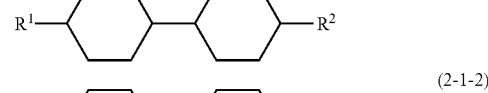
(2-1-2)

(2-1-3)

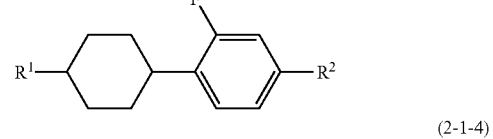
(2-1-4)

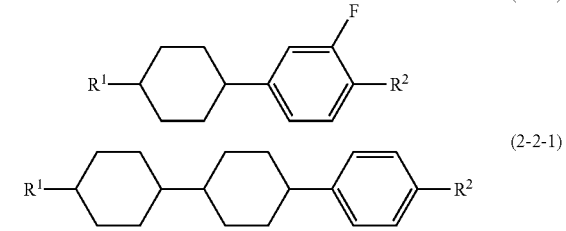
(2-2-1)

-continued

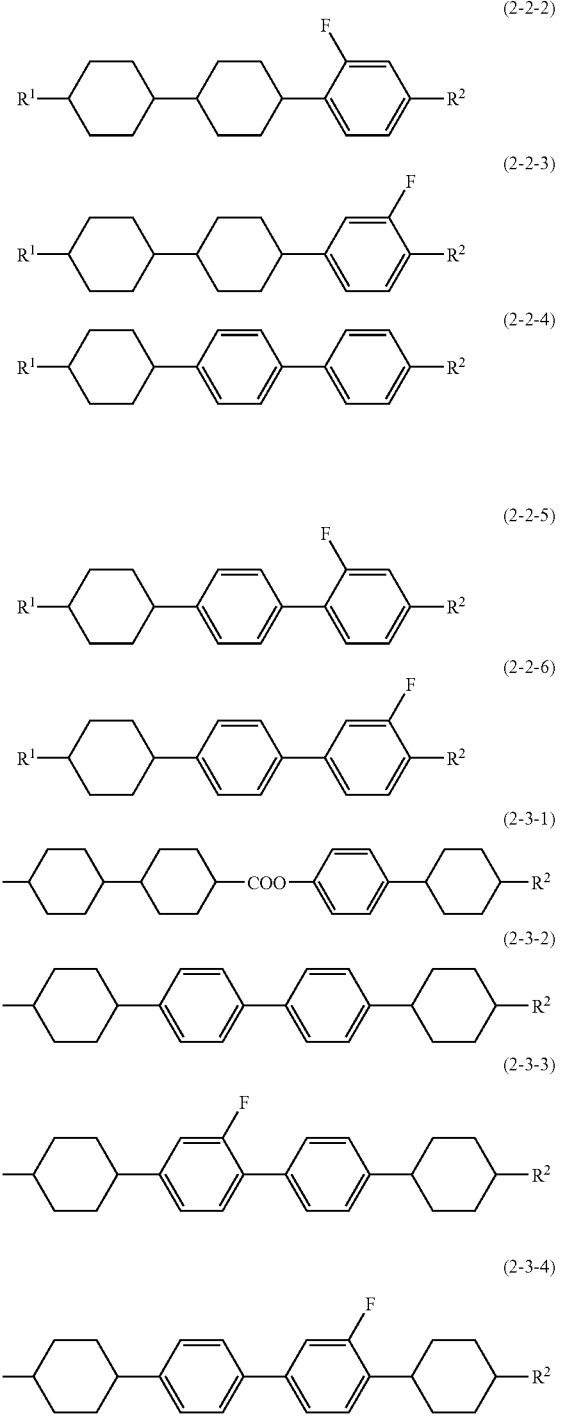

Sixth, the synthesis methods of the component compounds will be explained. These compounds can be synthesized by known methods as specified below. Compound (1-4-1) can be synthesized by modifying the method described in JP9-278698A1 (1997) or JP2003-2858A1. Compound (2-1-1) can be synthesized by the method described in JP59-70624A1 (1984) or JP60-16940A1 (1985).

The compounds for which the synthesis methods are not specified above can be synthesized by the methods described in books such as "Organic Synthesis (John Wiley&Sons, Inc)", "Organic Reactions (John Wiley&Sons, Inc)", "Comprehensive Organic Synthesis (Pergamon Press)", "New Experimental Chemistry Courses (Maruzen)", and so on. The composition is prepared from the compounds thus obtained by a well-known method. For example, the component compounds are mixed and heated to dissolve each other.

The composition of the present invention has optical anisotropy of mainly 0.05 to 0.11 and dielectric anisotropy of mainly −6.5 to −2.0. Preferable dielectric anisotropy is in the range of −5.0 to −2.5. The composition having the optical anisotropy of 0.05 to 0.18 or 0.05 to 0.20 may be prepared by controlling the ratio of the component compounds or by further mixing with other compounds. Therefore, this composition is suitable for the AM element which has the VA mode, the IPS mode, or the like. This composition is especially suitable for the AM element which has the VA mode.

The direction of the electric field in the element which has the TN mode or the like is perpendicular to the liquid crystal layer. On the other hand, the direction of the electric field in the element which has the VA mode, the IPS mode or the like is parallel to the liquid crystal layer. The structure of the element which has the VA mode is reported by K. Ohmuro, S. Kataoka, T. Sasaki and Y. Koike, in Digest of Technical Papers SID '97,28,845 (1997). The structure of the element which has the IPS mode is reported in WO91/10936A1 (U.S. Pat. No. 5,576,867A1). The composition of this invention is also suitable for these elements.

This composition can be used not only for the AM element but also for the PM element. This composition can be used for the element having modes such as PC, TN, STN, and OCB. These elements are reflection type, penetration type or half penetration type elements. This composition can also be used for a NCAP (nematic curvilinear aligned phase) element where the composition is microcapsulated or a PD (polymer dispersed) element where a three-dimensional reticular polymer is formed in the composition, such as a PN (polymer network) element.

EXAMPLE

This invention will be explained in detail by Examples. But, this invention is not limited by the following Examples. The compounds in the Examples and the Comparative Examples are expressed by the symbols according to the definitions set forth in the following Table 13. In Table 13, the configuration of 1,4-cyclohexylene is trans-form. In these examples, the parenthesized numbers next to the symbolized compounds correspond to those of the preferable compounds. The symbol (−) means a compound other than the component compounds. A ratio (percentage) of the compound is in terms of percent by weight (% by weight) based on the total weight of the composition. The characteristics of the composition are given last in terms of numeric value.

TABLE 13

Notation of the compounds by using symbols
R—(A₁)—Z₁—...—Zₙ—(Aₙ)—X

| 1) Left terminal group R— | Symbol | 2) Right terminal group —X | Symbol |
|---|---|---|---|
| $C_nH_{2n+1}$— | n- | —$OC_nH_{2n+1}$ | —On |
| $CH_2$=CH— | V— | —$C_nH_{2n+1}$ | -n |
| $C_nH_{2n+1}CH$=CH— | nV— | —CH=$CH_2$ | —V |
| CH=$CHC_nH_{2n+1}$ | Vn- | —$C_nH_{2n}CH$=$CH_2$ | -nV |

| 3) Ring structure —Aₙ- | Symbol | 4) Bonding group —Zₙ— | Symbol |
|---|---|---|---|
|  | H | —$CH_2O$— | 1O |
| 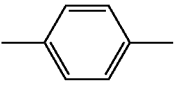 | B | —$OCF_2C_2H_4$— | $OCF_2$2 |
| 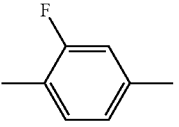 | B(2F) | —COO— | E |
| 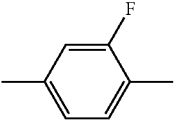 | B(3F) | —$C_2H_4COO$— | 2E |
| 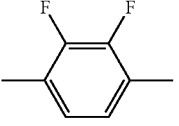 | B(2F, 3F) | | |
| 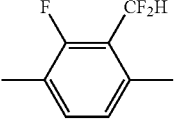 | B(2F, 3$CF_2H$) | | |
| 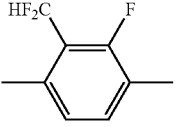 | B(2$CF_2H$, 3F) | | |

5) Notation example

Ex. 1  3-HH1O(2$CF_2H$, 3F)—O2

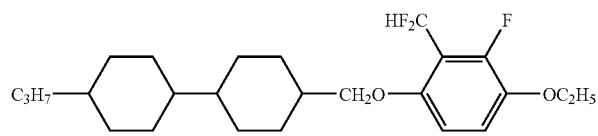

Ex. 2  3-HB$OCF_2$2B(2F, 3F)—O2

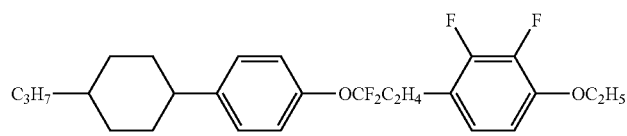

TABLE 13-continued

Notation of the compounds by using symbols
R—(A₁)—Z₁—. . . —Zₙ—(Aₙ)—X

Ex. 3 3-HB(2F, 3CF₂H)—O2

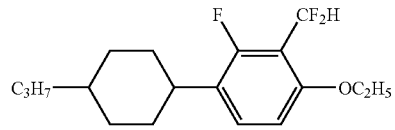

Ex. 4 5-H2EB(2F, 3F)—O2

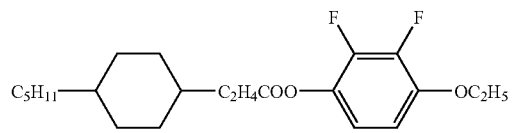

Numerical values of the characteristics were measured by the following methods. Most of them are the methods described in "Standards of Electric Industries Association of Japan EIAJ-ED-2521A" or modified methods thereof.

Upper limit temperature (NI; ° C.) of a nematic phase: A sample was placed on a hot plate in a melting-point measuring apparatus equipped with a polarizing microscope, and it was heated at a rate of 1° C./minute. The temperature was measured when a part of the sample changed from a nematic phase into an isotropic liquid. The upper limit temperature of a nematic phase may be abbreviated to "Upper limit temperature".

Lower limit temperature ($T_C$; ° C.) of a nematic phase: A sample having a nematic phase was kept in freezers at 0° C., −10° C., −20° C., −30° C., and −40° C. for ten days, respectively, and then its liquid crystal phase was observed. For instance, when the sample stayed in a nematic phase at −20° C. and changed into crystals or a smectic phase at −30° C., $T_C$ is expressed as <−20° C. The lower limit temperature of a nematic phase may be abbreviated to "Lower limit temperature".

Optical anisotropy (Refractive index anisotropy; Δn; measured at 25° C.): Optical anisotropy was measured by means of the Abbe refractometer which installed the polarizing plate in the ocular, using the light at a wavelength of 589 nm. After the surface of a main prism was subjected to rubbing in one direction, the sample was dropped on the main prism. Refractive index n∥ was measured when the direction of the polarized light was parallel to the direction of rubbing. Refractive index n⊥ was measured when the direction of the polarized light was perpendicular to the direction of rubbing. The value of optical anisotropy was calculated from the formula of Δn=n∥−n⊥. When the sample was a composition, optical anisotropy was measured by this method. When the sample was a compound, it was mixed into an appropriate composition to measure the optical anisotropy. Optical anisotropy of the compound is an extrapolation value.

Dielectric anisotropy (Δε; measured at 25° C.): A sample was put in the VA element whose gap of two glass substrates (cell gap) is 20 μm. When 0.5 volts were applied to this VA element, the dielectric constant (ε∥) in the direction of the long axis of the liquid crystal molecule was measured. A sample was placed in the TN element whose gap of two glass substrates is 9 μm. When 0.5 volts were applied to this TN element, dielectric constant (ε⊥) in the direction of the short axis of the liquid crystal molecule was measured. The value of dielectric anisotropy was calculated from the formula of Δε=ε∥−ε⊥. The composition having negative dielectric anisotropy was measured by this method. When the sample was a compound, it was mixed into an appropriate composition to measure the dielectric anisotropy. Dielectric anisotropy of the compound is an extrapolation value.

Rotation viscosity (γ1; measured at 25° C.; mPa·s): The measurement was carried out according to the method described by M. Imai et al in Molecular Crystals and Liquid Crystals, Vol. 259, and 37 (1995). A sample was placed in the VA element where the align film was made from octadecyltriethoxysilane and whose gap of two glass substrates (cell gap) is 20 μm. The voltage ranging from 39 to 50 volts was gradually applied to the VA element in increments of every one volt. After applying no voltage for 0.2 seconds, a cycle of only one rectangular wave (rectangular pulse; 0.2 seconds) and no applying (two seconds) was repeated. Peak current of the transient current generated by this applying and peak time were measured. The value of the rotation viscosity was obtained from these measurements using the calculation formula (8) on page 40 of M. Imai et al. paper. When the sample was a composition, the rotation viscosity was measured by this method. When the sample was a compound, it was mixed into an appropriate composition to measure the rotation viscosity. The rotation viscosity of the compound is an extrapolation value.

The voltage holding ratio (VHR; measured at 25° C. and 100° C., %): A sample was placed in the TN element where the align film was made from polyimide and whose gap of two glass substrates (cell gap) is 6 μm. The shape of waves of the voltage applied to the TN element at 25° C. was observed with the cathode rays oscilloscope, and at the unit cycle the area between the voltage curve and the abscissa was calculated. In the same way, the area was calculated from the shape of waves of the voltage applied after the TN element had been removed. The voltage holding ratio was calculated based on the comparison of the values of the two areas. The calculated value is shown as VHR-1. Next, this TN element was heated at 100° C. for 250 hours. After returning the temperature to 25° C., the voltage holding ratio was measured by a similar method. The value obtained after healing was shown as VHR-2. This heating test was conducted instead of the test which used the element for a long time.

Example 1

| | | |
|---|---|---|
| 5-HB(2F, 3CF$_2$H)-O2 | (1-1-1) | 12% |
| 3-HH1OB(2CF$_2$H, 3F)-O2 | (1-2-1) | 11% |
| 3-HH1OB(2F, 3CF$_2$H)-O2 | (1-2-2) | 11% |
| 5-HH-V | (2-1-1) | 25% |
| 3-HB-O2 | (2-1-2) | 7% |
| 5-HB-O2 | (2-1-2) | 7% |
| V-HHB-1 | (2-2-1) | 18% |
| 1V-HHEBH-4 | (2-3-1) | 2% |
| 3-HHEBH-4 | (2-3-1) | 2% |
| 5-HBB(3F)B-3 | (2-3-4) | 3% |
| 5-HBB(3F)B-V | (2-3-4) | 2% |

NI = 85.8° C.; Tc < −20° C.; Δn = 0.083; Δε = −2.3; γ1 = 150 mPa·s; VHR-1 = 99.5%.

Example 2

| | | |
|---|---|---|
| 3-HH1OB(2CF$_2$H, 3F)-O2 | (1-2-1) | 11% |
| 5-HH1OB(2CF$_2$H, 3F)-O2 | (1-2-1) | 11% |
| 3-HBOCF$_2$B(2F, 3F)-O2 | (1-4-1) | 10% |
| 5-HBOCF$_2$B(2F, 3F)-O2 | (1-4-1) | 10% |
| 5-HH-V | (2-1-1) | 25% |
| 3-HB-O2 | (2-1-2) | 10% |
| 5-HB-O2 | (2-1-2) | 9% |
| 3-HHB-1 | (2-2-1) | 4% |
| 3-HHB(2F)-O2 | (2-2-2) | 5% |
| 3-HHB(3F)-O2 | (2-2-3) | 5% |

NI = 88.3° C.; Tc ← 20° C.; Δn = 0.083; Δε = −2.6; γ1 = 140 mPa·s; VHR-1 = 99.5%.

Example 3

| | | |
|---|---|---|
| 3-HB(2F, 3CF$_2$H)-O2 | (1-1-1) | 9% |
| 5-HB(2F, 3CF$_2$H)-O2 | (1-1-1) | 10% |
| 3-HH1OB(2CF$_2$H, 3F)-O2 | (1-2-1) | 11% |
| 1V-HH1OB(2F, 3CF$_2$H)-1 | (1-2-2) | 11% |
| 5-HH-V | (2-1-1) | 25% |
| 5-HB-O2 | (2-1-2) | 7% |
| V-HHB-1 | (2-2-1) | 20% |
| 5-HBBH-V1 | (2-3-2) | 2% |
| 5-HB(3F)BH-3 | (2-3-3) | 4% |
| 1V2-HB(3F)BH-3 | (2-3-3) | 1% |

NI = 78.8° C.; Tc < −20° C.; Δn = 0.079; Δε = −2.7; γ1 = 152 mPa·s; VHR-1 = 99.4%.

Example 4

| | | |
|---|---|---|
| 3-HB(2F, 3CF$_2$H)-O2 | (1-1-1) | 10% |
| 3-HH1OB(2CF$_2$H, 3F)-O2 | (1-2-1) | 11% |
| 5-HH1OB(2CF$_2$H, 3F)-O2 | (1-2-1) | 11% |
| 3-HBOCF$_2$B(2F, 3F)-O2 | (1-4-1) | 10% |
| 5-HBOCF$_2$B(2F, 3F)-O2 | (1-4-1) | 10% |
| 3-HH-4 | (2-1-1) | 10% |
| 2-HH-5 | (2-1-1) | 9% |
| 5-HB-O2 | (2-1-2) | 9% |
| 3-HBB(2F)-O2 | (2-2-5) | 10% |
| 3-HBB(3F)-O2 | (2-2-6) | 10% |

NI = 90.6° C.; Tc < −20° C.; Δn = 0.102; Δε = −3.3; γ1 = 235 mPa·s; VHR-1 = 99.6%

Example 5

| | | |
|---|---|---|
| 3-HB(2F, 3CF$_2$H)-O2 | (1-1-1) | 9% |
| 3-HHB(2F, 3CF$_2$H)-O2 | (1-3-1) | 11% |
| 5-HHB(2F, 3CF$_2$H)-O2 | (1-3-1) | 11% |
| 3-HBOCF$_2$B(2F, 3F)-O2 | (1-4-1) | 10% |
| 5-HBOCF$_2$B(2F, 3F)-O2 | (1-4-1) | 10% |
| 5-HH-V | (2-1-1) | 22% |
| 5-HB(2F)-O2 | (2-1-3) | 7% |
| 3-HB(3F)-O2 | (2-1-4) | 2% |
| V-HHB-1 | (2-2-1) | 16% |
| 3-HBB-1 | (2-2-4) | 2% |

NI = 80.9° C.; Tc < −20° C.; Δn = 0.083; Δε = −2.8; γ1 = 180 mPa·s; VHR-1 = 99.5%.

Example 6

| | | |
|---|---|---|
| 3-HB(2F, 3CF$_2$H)-O2 | (1-1-1) | 9% |
| 3-HHB(2F, 3CF$_2$H)-O2 | (1-3-1) | 11% |
| 5-HHB(2F, 3CF$_2$H)-O2 | (1-3-1) | 11% |
| 3-HBOCF$_2$B(2F, 3F)-O2 | (1-4-1) | 15% |
| 5-HBOCF$_2$B(2F, 3F)-O2 | (1-4-1) | 15% |
| 5-HH-V | (2-1-1) | 30% |
| V-HHB-1 | (2-2-1) | 9% |

NI = 81.0° C.; Tc < −20° C.; Δn = 0.080; Δε = −3.2; γ1 = 180 mPa·s; VHR-1 = 99.4%.

Comparison Example 1

| | | |
|---|---|---|
| 3-HH-4 | (2-1-1) | 10% |
| 3-HH-5 | (2-1-1) | 10% |
| 5-HB-3 | (2-1-2) | 8% |
| 3-HB-O1 | (2-1-2) | 6% |
| 3-HB(2F,3F)-O4 | (-) | 15% |
| 5-HB(2F,3F)-O4 | (-) | 13% |
| 2-HHB(2F,3F)-1 | (-) | 9% |
| 3-HHB(2F,3F)-1 | (-) | 9% |
| 3-HHB(2F,3F)-O2 | (-) | 10% |
| 5-HHB(2F,3F)-O2 | (-) | 10% |

NI = 68.0° C.;
Δε = −2.7;
VHR-1 = 99.6.

Comparison Example 2

| | | |
|---|---|---|
| 3-HH-4 | (2-1-1) | 10% |
| 3-HH-5 | (2-1-1) | 10% |
| 5-HB-3 | (2-1-2) | 8% |
| 3-HB-O1 | (2-1-2) | 6% |
| 3-HB(2F, 3F)-O4 | (—) | 15% |
| 5-HB(2F, 3F)-O2 | (—) | 13% |
| 2-HHB(2F, 3F)-1 | (—) | 9% |
| 3-HHB(2F, 3F)-1 | (—) | 9% |
| 3-HHB(2F, 3F)-O2 | (—) | 10% |
| 5-HHB(2F, 3F)-O2 | (—) | 10% |

NI = 70.5° C.; Δε = −2.8; VHR-1 = 99.6%.

Example 7

| | | |
|---|---|---|
| 3-HH1OB(2CF$_2$H, 3F)-O2 | (1-2-1) | 14% |
| 5-HH1OB(2CF$_2$H, 3F)-O2 | (1-2-1) | 14% |
| 3-HBOCF$_2$B(2F, 3F)-1 | (1-4-1) | 9% |
| 5-HBOCF$_2$B(2F, 3F)-1 | (1-4-1) | 9% |
| 3-HBOCF$_2$B(2F, 3F)-O2 | (1-4-1) | 10% |
| 5-HBOCF$_2$B(2F, 3F)-O2 | (1-4-1) | 10% |
| 3-HH-4 | (2-1-1) | 10% |
| 3-HH-5 | (2-1-1) | 10% |
| 5-HB-3 | (2-1-2) | 8% |
| 3-HB-O1 | (2-1-2) | 6% |

NI = 76.8° C.; Δε = −4.0; VHR-1 = 99.6%.

Compared with the compositions of Comparison Examples 1 and 2, the composition of Example 7 has negatively large dielectric anisotropy, similar VHR-1 and a higher upper limit temperature.

Example 8

| | | |
|---|---|---|
| 3-HB(2F, 3CF$_2$H)-1 | (1-1-1) | 5% |
| 3-HH1OB(2CF$_2$H, 3F)-1 | (1-2-1) | 2% |
| V-HH1OB(2CF$_2$H, 3F)-O2 | (1-2-1) | 10% |
| 5-HH1OB(2CF$_2$H, 3F)-O2 | (1-2-1) | 10% |
| V-HBOCF$_2$B(2F, 3F)-1 | (1-4-1) | 4% |
| 3-HBOCF$_2$B(2F, 3F)-O2 | (1-4-1) | 8% |
| 5-HBOCF$_2$B(2F, 3F)-O2 | (1-4-1) | 8% |
| 1V-H2EB(2F, 3F)-1 | (1-5-1) | 2% |
| 5-H2EB(2F, 3F)-O2 | (1-5-1) | 2% |
| 3-HH-4 | (2-1-1) | 10% |
| 2-HH-5 | (2-1-1) | 10% |
| 3-HB-O2 | (2-1-2) | 9% |
| 3-HB-OV | (2-1-2) | 1% |
| V-HHB-1 | (2-2-1) | 19% |

NI = 86.9° C.; Tc < −20° C.; Δn = 0.090; Δε = −3.3; γ1 = 160 mPa·s; VHR-1 = 99.5%

Example 9

| | | |
|---|---|---|
| 1V-HB(2F, 3CF$_2$H)-O2 | (1-1-1) | 9% |
| V-HHB(2F, 3CF$_2$H)-1 | (1-3-1) | 4% |
| 3-HHB(2F, 3CF$_2$H)-O2 | (1-3-1) | 7% |
| 5-HHB(2F, 3CF$_2$H)-O2 | (1-3-1) | 11% |
| 3-HBOCF$_2$B(2F, 3F)-O2 | (1-4-1) | 15% |
| 5-HBOCF$_2$B(2F, 3F)-O2 | (1-4-1) | 15% |
| 3-HH-O1 | (2-1-1) | 10% |
| 5-HH-V | (2-1-1) | 20% |
| 3-HHB-1 | (2-2-1) | 3% |
| 3-HHB-3 | (2-2-1) | 4% |
| 3-HHB-O1 | (2-2-1) | 2% |

NI = 83.9° C.; Tc < −20° C.; Δn = 0.081; Δε = −3.2; γ1 = 188 mPa·s; VHR-1 = 99.4%.

Example 10

| | | |
|---|---|---|
| 3-HB(2F, 3CF$_2$H)-O2 | (1-1-1) | 4% |
| 2-HH1O(2CF$_2$H, 3F)-O2 | (1-2-1) | 10% |
| 3-HH1O(2CF$_2$H, 3F)-O2 | (1-2-1) | 10% |
| 3-HBOCF$_2$B(2F, 3F)-O2 | (1-4-1) | 10% |
| 4-HBOCF$_2$B(2F, 3F)-O2 | (1-4-1) | 10% |
| 5-HBOCF$_2$B(2F, 3F)-O2 | (1-4-1) | 10% |
| 5-HH-V | (2-1-1) | 22% |
| 3-HH-V1 | (2-1-1) | 6% |
| V1-HB(2F)-1 | (2-1-3) | 5% |
| 1V-HB(3F)-2 | (2-1-4) | 5% |
| 1V-HHB(2F)-1 | (2-2-2) | 3% |
| V-HHB(3F)-V | (2-2-3) | 5% |

NI = 79.1° C.; Tc < −20° C.; Δn = 0.085; Δε = −4.0; γ1 = 140 mPa·s; VHR-1 = 99.6%.

Example 11

| | | |
|---|---|---|
| 3-HB(2F, 3CF$_2$H)-O2 | (1-1-1) | 9% |
| 3-HHB(2F, 3CF$_2$H)-O2 | (1-3-1) | 6% |
| 5-HHB(2F, 3CF$_2$H)-O2 | (1-3-1) | 6% |
| 2-HBOCF$_2$B(2F, 3F)-O2 | (1-4-1) | 9% |
| 3-HBOCF$_2$B(2F, 3F)-O2 | (1-4-1) | 11% |
| 4-HBOCF$_2$B(2F, 3F)-O2 | (1-4-1) | 11% |
| 5-HBOCF$_2$B(2F, 3F)-O2 | (1-4-1) | 11% |
| 5-HH-V | (2-1-1) | 22% |
| 3-HB-O2 | (2-1-2) | 5% |
| 3-HBB-OV | (2-2-4) | 2% |
| V-HBB(2F)-2 | (2-2-5) | 4% |
| 1V-HBB(3F)-1 | (2-2-6) | 4% |

NI = 79.0° C.; Tc < −20° C.; Δn = 0.094; Δε = −3.2; γ1 = 175 mPa·s; VHR-1 = 99.5%.

Example 12

To the composition of Example 11 were added 100 ppm of 2-(2-hydroxy-5-methylphenyl)benzotriazole as an ultraviolet rays absorbent and 100 ppm of 3,5-di-tert-butyl-4-hydroxytoluene as an antioxidant. The characteristics of the resulting composition are as follows. NI=79.0° C.; Tc<−20° C.; Δn=0.094; Δε=−3.2; VHR-1=99.5%.

Example 13

| | | |
|---|---|---|
| 3-HH1O(2CF$_2$H, 3F)-O2 | (1-2-1) | 10% |
| 5-HH1O(2CF$_2$H, 3F)-O2 | (1-2-1) | 10% |
| 3-HBOCF$_2$B(2F, 3F)-O2 | (1-4-1) | 15% |
| 5-HBOCF$_2$B(2F, 3F)-O2 | (1-4-1) | 15% |
| 3-BOCF$_2$B(2F, 3F)-O2 | (1-6-1) | 8% |
| 5-HH-V | (2-1-1) | 30% |
| 3-HB-O2 | (2-1-2) | 4% |
| V-HHB-1 | (2-2-1) | 8% |

NI = 79.9° C.; Tc < −20° C.; Δn = 0.079; Δε = −3.2; γ1 = 161 mPa·s; VHR-1 = 99.6%.

Example 14

| | | |
|---|---|---|
| 3-HB(2F, 3CF$_2$H)-O2 | (1-1-1) | 9% |
| 3-HHB(2F, 3CF$_2$H)-O2 | (1-3-1) | 11% |
| 5-HHB(2F, 3CF$_2$H)-O2 | (1-3-1) | 11% |
| 3-HBOCF$_2$B(2F, 3F)-O2 | (1-4-1) | 10% |
| 5-HBOCF$_2$B(2F, 3F)-O2 | (1-4-1) | 10% |
| 5-HH-V | (2-1-1) | 15% |
| 5-HB(2F)-O2 | (2-1-3) | 7% |
| 3-HB(2F)-O2 | (2-1-4) | 2% |

| -continued | | |
|---|---|---|
| V-HHB-1 | (2-2-1) | 16% |
| 3-HBB-1 | (2-2-4) | 2% |
| 1O1-HH-3 | (—) | 7% |

NI = 80.3° C.; Tc < −20° C.; Δn = 0.083; Δε = −2.7; γ1 = 187 mPa · s; VHR-1 = 99.4%.

What is claimed is:

1. A liquid crystal composition having negative dielectric anisotropy comprising:

as a first component, at least two compounds represented by at least two formulas selected from formulas (1-1) to (1-6) in the range of 20 to 75% by weight based on the total weight of the liquid crystal composition, and as a second component, at least one compound selected from the group of the compounds represented by formulas (2-1) to (2-3) in the range of 25 to 75% by weight based on the total weight of the liquid crystal composition;

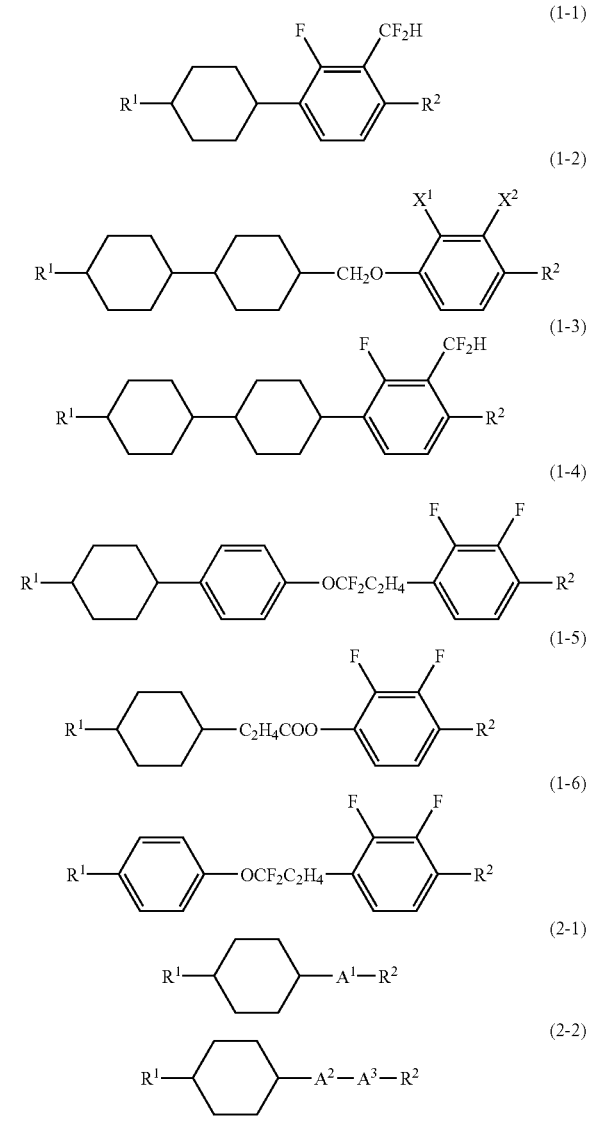

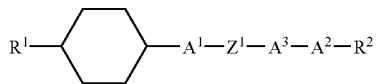

wherein $R^1$ is alkyl or alkenyl; $R^2$ is alkyl, alkenyl or alkoxy; $Z_1$ is a single bond or —COO—; $A^1$ is 1,4-cyclohexylene, 1,4-phenylene, or 1,4-phenylene in which any hydrogen may be replaced by fluorine; $A^2$ is 1,4-cyclohexylene or 1,4-phenylene; $A^3$ is 1,4-phenylene, or 1,4-phenylene in which any hydrogen may be replaced by fluorine; one of $X^1$ and $X^2$ is fluorine and the other is —$CF_2H$.

2. A liquid crystal composition of claim 1, wherein $X^1$ is —$CF_2H$ and $X^2$ is fluorine.

3. A liquid crystal composition of claim 1 or 2, wherein one of at least two formulas selected from formulas (1-1) to (1-6) as the first component is formula (1-2), (1-4), (1-5) or (1-6).

4. A liquid crystal composition of claim 3, wherein the first component is at least two compounds represented by at least two formulas selected from formulas (1-2), (1-4), (1-5) and (1-6).

5. A liquid crystal composition of claim 1 or 2, wherein the first component is at least one compound represented by formula (1-4) and at least one compound represented by formula (1-6).

6. A liquid crystal composition of claim 1 or 2, wherein the first component is at least one compound represented by formula (1-2) and at least one compound represented by formula (1-4).

7. A liquid crystal composition of claim 1 or 2, wherein the first component is at least one compound represented by formula (1-2), at least one compound represented by formula (1-4) and at least one compound represented by formula (1-5).

8. A liquid crystal composition of claim 1 or 2, wherein the first component is at least one compound represented by formula (1-2), at least one compound represented by formula (1-4) and at least one compound represented by formula (1-6).

9. A liquid crystal composition of claim 1 or 2, wherein the first component is at least one compound represented by formula (1-2) and at least one compound represented by formula (1-5).

10. A liquid crystal composition of claim 1 or 2, wherein the first component is at least one compound represented by formula (1-2) and at least one compound represented by formula (1-6).

11. A liquid crystal composition of claim 1 or 2, wherein the first component is at least one compound represented by formula (1-3) and at least one compound represented by formula (1-5).

12. A liquid crystal composition of claim 1 or 2, wherein the first component is at least one compound represented by formula (1-3) and at least one compound represented by formula (1-6).

13. A liquid crystal composition of claim 1 or 2, wherein the first component is at least one compound represented by formula (1-4) and at least one compound represented by formula (1-5).

14. A liquid crystal composition of claim 1 or 2, wherein the first component is at least one compound represented by formula (1-3) and at least one compound represented by formula (1-4).

15. A liquid crystal composition of claim 1 or 2, wherein the first component is at least one compound represented by formula (1-3), at least one compound represented by formula (1-4) and at least one compound represented by formula (1-5).

16. A liquid crystal composition of claim 1 or 2, wherein the first component is at least one compound represented by formula (1-3), at least one compound represented by formula (1-4) and at least one compound represented by formula (1-6).

17. A liquid crystal composition of claim 5, wherein the second component is at least one compound selected from the group of the compounds represented by formulas (2-1-1), (2-1-2), (2-1-3), (2-1-4), (2-2-1), (2-2-2), (2-2-3), (2-2-4), (2-2-5), (2-2-6), (2-3-1), (2-3-2), (2-3-3) and (2-3-4);

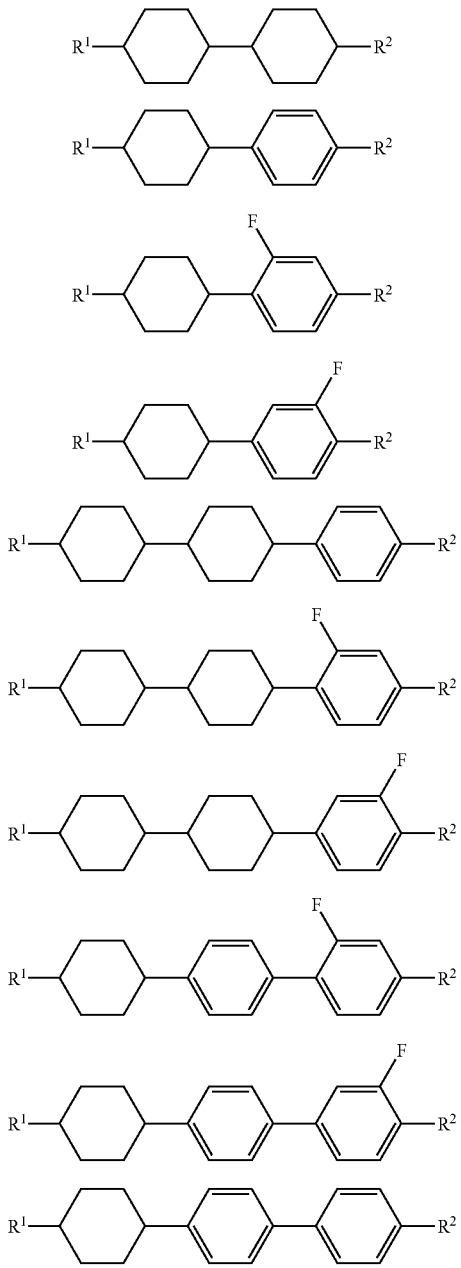

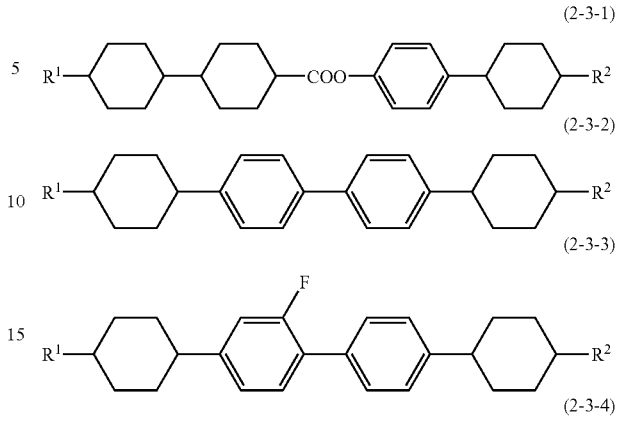

wherein $R^1$ is alkyl or alkenyl; and $R^2$ is alkyl, alkenyl or alkoxy.

18. A liquid crystal composition of claim 6, wherein the second component is at least one compound selected from the group of the compounds represented by formulas (2-1-1), (2-1-2), (2-1-3), (2-1-4), (2-2-1), (2-2-2), (2-2-3), (2-2-4), (2-2-5), (2-2-6), (2-3-1), (2-3-2), (2-3-3) and (2-3-4).

19. A liquid crystal composition of claim 7, wherein the second component is at least one compound selected from the group of the compounds represented by formulas (2-1-1), (2-1-2), (2-1-3), (2-1-4), (2-2-1), (2-2-2), (2-2-3), (2-2-4), (2-2-5), (2-2-6), (2-3-1), (2-3-2), (2-3-3) and (2-3-4).

20. A liquid crystal composition of claim 8, wherein the second component is at least one compound selected from the group of the compounds represented by formulas (2-1-1), (2-1-2), (2-1-3), (2-1-4), (2-2-1), (2-2-2), (2-2-3), (2-2-4), (2-2-5), (2-2-6), (2-3-1), (2-3-2), (2-3-3) and (2-3-4).

21. A liquid crystal composition of claim 11, wherein the second component is at least one compound selected from the group of the compounds represented by formulas (2-1-1), (2-1-2), (2-1-3), (2-1-4), (2-2-1), (2-2-2), (2-2-3), (2-2-4), (2-2-5), (2-2-6), (2-3-1), (2-3-2), (2-3-3) and (2-3-4).

22. A liquid crystal composition of claim 12, wherein the second component is at least one compound selected from the group of the compounds represented by formulas (2-1-1), (2-1-2), (2-1-3), (2-1-4), (2-2-1), (2-2-2), (2-2-3), (2-2-4), (2-2-5), (2-2-6), (2-3-1), (2-3-2), (2-3-3) and (2-3-4).

23. A liquid crystal composition of claim 13, wherein the second component is at least one compound selected from the group of the compounds represented by formulas (2-1-1), (2-1-2), (2-1-3), (2-1-4), (2-2-1), (2-2-2), (2-2-3), (2-2-4), (2-2-5), (2-2-6), (2-3-1), (2-3-2), (2-3-3) and (2-3-4).

24. A liquid crystal composition of claim 14, wherein the second component is at least one compound selected from the group of the compounds represented by formulas (2-1-1), (2-1-2), (2-1-3), (2-1-4), (2-2-1), (2-2-2), (2-2-3), (2-2-4), (2-2-5), (2-2-6), (2-3-1), (2-3-2), (2-3-3) and (2-3-4).

25. A liquid crystal composition of claim 17, wherein the second component is at least one compound selected from the group of the compounds represented by formula (2-1-1), (2-1-2), (2-2-1), (2-2-4), (2-3-1) and (2-3-4).

26. A liquid crystal composition of claim 18, wherein the second component is at least one compound selected from the group of the compounds represented by formula (2-1-1), (2-1-2), (2-2-1), (2-2-4), (2-3-1) and (2-3-4).

27. A liquid crystal composition of claim 19, wherein the second component is at least one compound selected from the group of the compounds represented by formula (2-1-1), (2-1-2), (2-2-1), (2-2-4), (2-3-1) and (2-3-4).

28. A liquid crystal composition of claim 20, wherein the second component is at least one compound selected from the group of the compounds represented by formula (2-1-1), (2-1-2), (2-2-1), (2-2-4), (2-3-1) and (2-3-4).

29. A liquid crystal composition of claim 21, wherein the second component is at least one compound selected from the group of the compounds represented by formula (2-1-1), (2-1-2), (2-2-1), (2-2-4), (2-3-1) and (2-3-4).

30. A liquid crystal composition of claim 22, wherein the second component is at least one compound selected from the group of the compounds represented by formula (2-1-1), (2-1-2), (2-2-1), (2-2-4), (2-3-1) and (2-3-4).

31. A liquid crystal composition of claim 23, wherein the second component is at least one compound selected from the group of the compounds represented by formula (2-1-1), (2-1-2), (2-2-1), (2-2-4), (2-3-1) and (2-3-4).

32. A liquid crystal composition of claim 24, wherein the second component is at least one compound selected from the group of the compounds represented by formula (2-1-1), (2-1-2), (2-2-1), (2-2-4), (2-3-1) and (2-3-4).

33. A liquid crystal composition of claim 1, wherein the dielectric anisotropy ranges from −6.5 to −2.0.

34. A liquid crystal display element which comprises the liquid crystal composition of claim 1.

35. A liquid crystal display element of claim 34, wherein the element has VA mode or IPS mode and is driven by active matrix.

36. A method of using the liquid crystal composition of claim 1 for a liquid crystal display element which has VA mode or IPS mode and is driven by active matrix.

* * * * *